(12) United States Patent
Houhoulis

(10) Patent No.: US 10,400,306 B2
(45) Date of Patent: Sep. 3, 2019

(54) BRINE LEACHING PROCESS FOR RECOVERING VALUABLE METALS FROM OXIDE MATERIALS

(71) Applicant: Summit Mining International Inc., Denver, CO (US)

(72) Inventor: Martin Fred Houhoulis, Westcliffe, CO (US)

(73) Assignee: Summit Mining International Inc., Denver, CO (US)

(*) Notice: Subject to any disclaimer, the term of this patent is extended or adjusted under 35 U.S.C. 154(b) by 597 days.

(21) Appl. No.: 14/703,308

(22) Filed: May 4, 2015

(65) Prior Publication Data

US 2015/0322544 A1    Nov. 12, 2015

Related U.S. Application Data

(60) Provisional application No. 61/992,036, filed on May 12, 2014.

(51) Int. Cl.

| | |
|---|---|
| *C22B 3/04* | (2006.01) |
| *C25C 1/20* | (2006.01) |
| *C22B 3/44* | (2006.01) |
| *C22B 3/00* | (2006.01) |
| *B01J 19/18* | (2006.01) |
| *B01J 19/24* | (2006.01) |

(Continued)

(52) U.S. Cl.
CPC .......... *C22B 11/04* (2013.01); *B01J 19/1806* (2013.01); *B01J 19/2405* (2013.01); *C22B 3/02* (2013.01); *C22B 3/04* (2013.01); *C22B 3/18* (2013.01); *C22B 3/44* (2013.01); *C25C 1/20* (2013.01); *B01J 2219/24* (2013.01); *Y02P 10/234* (2015.11)

(58) Field of Classification Search
CPC .............. C22B 11/04; C22B 3/04; C22B 3/44
See application file for complete search history.

(56) References Cited

U.S. PATENT DOCUMENTS

| | | |
|---|---|---|
| 521,898 A | 6/1894 | Sutton |
| 571,468 A | 11/1896 | Barbour |
| 1,475,843 A | 11/1923 | Mackay |

(Continued)

FOREIGN PATENT DOCUMENTS

| | | |
|---|---|---|
| AU | 4366279 | 7/1980 |
| BR | PI9100152 | 9/1992 |

(Continued)

OTHER PUBLICATIONS

Kappes "Chloride Leaching for Silver, Copper, Lead and Antimony—Industrial Experience in the 600 Tonne/Day Itos, Bolivia, Plant," Chloride Metallurgy 2002, CIM—Montreal, Oct. 2002, 15 pages.

(Continued)

*Primary Examiner* — Melissa S Swain
(74) *Attorney, Agent, or Firm* — Sheridan Ross P.C.

(57) ABSTRACT

A process is provided in which a silver- and base metal-containing material is contacted with an aqueous solution comprising an alkali and/or alkaline earth metal halide and an oxidant at a solution pH of at least about pH 6 to dissolve the silver into a pregnant leach solution while maintaining at least most of the base metal in the silver- and base metal-containing material.

25 Claims, 2 Drawing Sheets

(51) Int. Cl.
  *C22B 3/18* (2006.01)
  *C22B 3/02* (2006.01)

(56) References Cited

U.S. PATENT DOCUMENTS

| | | | |
|---|---|---|---|
| 1,886,162 A | 11/1932 | Christensen | |
| 2,733,990 A | 2/1956 | Van Hare, Jr. et al. | |
| 2,813,020 A | 11/1957 | Van Hare, Jr. | |
| 3,594,157 A | 7/1971 | Hendrickson et al. | |
| 3,647,261 A | 3/1972 | Stenger et al. | |
| 3,699,208 A | 10/1972 | Grunig et al. | |
| 3,785,944 A | 1/1974 | Atwood et al. | |
| 3,798,026 A | 3/1974 | Milner et al. | |
| 3,840,365 A | 10/1974 | Hammes, Sr. et al. | |
| 3,865,744 A | 2/1975 | Parker et al. | |
| 3,965,239 A | 6/1976 | Posel | |
| 3,966,462 A | 6/1976 | Posel et al. | |
| 3,966,890 A | 6/1976 | Parker et al. | |
| 3,973,949 A | 8/1976 | Goens et al. | |
| 3,981,962 A | 9/1976 | Smyres et al. | |
| 4,011,146 A | 3/1977 | Coltrinari et al. | |
| 4,038,361 A | 7/1977 | Posel | |
| 4,061,552 A | 12/1977 | Everett | |
| 4,082,629 A | 4/1978 | Milner et al. | |
| 4,097,271 A | 6/1978 | Swinkels et al. | |
| 4,113,848 A | 9/1978 | Parker et al. | |
| 4,124,457 A | 11/1978 | Stauter et al. | |
| 4,131,454 A | 12/1978 | Piret et al. | |
| 4,288,304 A | 9/1981 | DeMarthe et al. | |
| 4,342,592 A | 8/1982 | Lamb | |
| 4,378,275 A | 3/1983 | Adamson et al. | |
| 4,401,468 A | 8/1983 | Henderson | |
| 4,452,762 A | 6/1984 | Fugleberg et al. | |
| 4,536,214 A | 8/1985 | Ochs et al. | |
| 4,551,213 A | 11/1985 | Wilson | |
| 4,634,507 A | 1/1987 | Nogueira et al. | |
| 4,642,134 A | 2/1987 | Van Antwerp et al. | |
| 4,647,307 A | 3/1987 | Raudsepp et al. | |
| 4,723,998 A | 2/1988 | O'Neil | |
| 4,752,412 A | 6/1988 | Van Antwerp et al. | |
| 4,902,345 A | 2/1990 | Ball et al. | |
| 4,980,134 A | 12/1990 | Butler | |
| 5,078,786 A | 1/1992 | Peters et al. | |
| 5,096,486 A | 3/1992 | Anderson et al. | |
| 5,104,445 A | 4/1992 | Dubrovsky et al. | |
| 5,169,503 A | 12/1992 | Baughman et al. | |
| 5,188,713 A | 2/1993 | O'Brien et al. | |
| 5,232,490 A | 8/1993 | Bender et al. | |
| 5,308,381 A | 5/1994 | Han et al. | |
| 5,316,567 A | 5/1994 | Jones | |
| 5,328,669 A | 7/1994 | Han et al. | |
| 5,399,762 A | 3/1995 | Walker | |
| 5,401,296 A | 3/1995 | Martenson et al. | |
| 5,438,034 A | 8/1995 | Walker | |
| 5,443,621 A | 8/1995 | Kohr | |
| 5,484,470 A | 1/1996 | Kristjansdottir et al. | |
| 5,487,819 A | 1/1996 | Everett | |
| 5,529,606 A | 6/1996 | Hewlett | |
| 5,603,750 A | 2/1997 | Sierakaowski et al. | |
| 5,607,619 A | 3/1997 | Dadgar et al. | |
| 5,614,097 A | 3/1997 | Bender et al. | |
| 5,620,585 A | 4/1997 | Dadgar et al. | |
| 5,626,647 A | 5/1997 | Kohr | |
| 5,700,841 A | 12/1997 | Walker | |
| 5,855,817 A | 1/1999 | Walker | |
| 6,008,028 A | 12/1999 | Bender et al. | |
| 6,033,559 A | 3/2000 | Bender et al. | |
| 6,087,303 A | 7/2000 | Walker | |
| 6,090,855 A | 7/2000 | Walker | |
| 6,126,720 A | 10/2000 | Okada et al. | |
| 6,482,373 B1 | 11/2002 | Hannaford et al. | |
| 6,770,249 B1 | 8/2004 | Hoboy et al. | |
| 6,863,873 B1 | 3/2005 | Hoboy et al. | |
| 7,465,334 B2 | 12/2008 | Moyes et al. | |
| 7,537,741 B2 | 5/2009 | Lalancette | |
| 7,544,232 B2 | 6/2009 | Hackl et al. | |
| 7,559,971 B2 | 7/2009 | Hyvarinen et al. | |
| 7,601,200 B2 | 10/2009 | Heguri et al. | |
| 7,722,840 B2 | 5/2010 | Hackl et al. | |
| 7,736,606 B2 | 6/2010 | Harris et al. | |
| 7,858,056 B2 | 12/2010 | Moyes et al. | |
| 7,871,454 B2 | 1/2011 | dos Santos | |
| 7,968,065 B2 | 6/2011 | Harris et al. | |
| 8,097,227 B2 | 1/2012 | Hackl et al. | |
| 8,585,991 B2 | 11/2013 | Dreisinger et al. | |
| 2002/0152845 A1 | 10/2002 | Fleming et al. | |
| 2004/0050716 A1 | 3/2004 | Jones et al. | |
| 2004/0144208 A1 | 7/2004 | Ando et al. | |
| 2004/0156765 A1 | 8/2004 | Lalancette | |
| 2004/0168909 A1 | 9/2004 | Larson | |
| 2005/0066774 A1 | 3/2005 | Asano et al. | |
| 2005/0255017 A1 | 11/2005 | Okada et al. | |
| 2006/0147360 A1 | 7/2006 | Takeda et al. | |
| 2006/0193762 A1 | 8/2006 | Misra et al. | |
| 2008/0241024 A1 | 10/2008 | Riekkola-Vanhanen et al. | |
| 2008/0247925 A1 | 10/2008 | Wallace et al. | |
| 2009/0272229 A1 | 11/2009 | dos Santos | |
| 2009/0324536 A1 | 12/2009 | Sun et al. | |
| 2012/0227545 A1 | 9/2012 | Padayachee et al. | |
| 2012/0292196 A1 | 11/2012 | Albrecht et al. | |
| 2012/0292197 A1 | 11/2012 | Albrecht et al. | |
| 2012/0328494 A1 | 12/2012 | Dreisinger et al. | |
| 2013/0074655 A1* | 3/2013 | Lalancette | C22B 11/06 75/744 |
| 2013/0091990 A1 | 4/2013 | Choi et al. | |
| 2013/0184835 A1 | 7/2013 | Ferrari et al. | |
| 2013/0206606 A1 | 8/2013 | Gilliam et al. | |
| 2013/0209335 A1 | 8/2013 | Dixon et al. | |
| 2013/0220079 A1 | 8/2013 | Harris et al. | |
| 2013/0333524 A1 | 12/2013 | Aghemio Rodriguez | |
| 2014/0230604 A1 | 8/2014 | Pavlovich et al. | |

FOREIGN PATENT DOCUMENTS

| | | |
|---|---|---|
| CA | 520267 | 1/1956 |
| CA | 938793 | 12/1973 |
| CA | 1000953 | 12/1976 |
| CA | 1021572 | 11/1977 |
| CA | 1071569 | 2/1980 |
| CA | 2282470 | 9/1998 |
| CA | 2730558 | 6/2004 |
| CA | 2448999 | 8/2004 |
| CA | 2475833 | 7/2005 |
| CA | 2639796 | 6/2007 |
| CA | 2819585 | 6/2012 |
| CA | 2833281 | 11/2012 |
| CA | 2791056 | 5/2014 |
| CN | 1088266 | 6/1994 |
| CN | 1180755 | 5/1998 |
| CN | 1450182 | 10/2003 |
| CN | 1500892 | 6/2004 |
| CN | 100462453 | 2/2009 |
| CN | 101451190 | 6/2009 |
| CN | 101575715 | 11/2009 |
| CN | 101730753 | 6/2010 |
| CN | 101072885 | 7/2011 |
| CN | 101090983 | 8/2011 |
| CN | 101787440 | 8/2011 |
| CN | 101824534 | 9/2011 |
| CN | 102373338 | 3/2012 |
| CN | 101336306 | 5/2012 |
| CN | 102459659 | 5/2012 |
| CN | 102703690 | 10/2012 |
| CN | 102168176 | 11/2012 |
| CN | 103114202 | 5/2013 |
| CN | 102634666 | 6/2013 |
| CN | 102690955 | 7/2013 |
| CN | 103266225 | 8/2013 |
| CN | 103468947 | 12/2013 |
| CN | 102912143 | 3/2014 |
| CN | 103898325 | 7/2014 |
| DE | 2216383 | 10/1972 |
| DE | 2719982 | 11/1977 |
| EP | 0089184 | 9/1983 |

(56) References Cited

FOREIGN PATENT DOCUMENTS

| | | |
|---|---|---|
| EP | 155250 | 9/1985 |
| EP | 61468 | 1/1987 |
| EP | 223837 | 8/1992 |
| EP | 1559799 | 8/2005 |
| EP | 1577408 | 9/2005 |
| EP | 1114704 | 11/2005 |
| EP | 1954843 | 8/2008 |
| EP | 1809777 | 3/2009 |
| GB | 189413850 | 8/1894 |
| GB | 142854 | 12/1920 |
| GB | 194353 | 3/1923 |
| GB | 2040896 | 9/1980 |
| GB | 2180829 | 4/1987 |
| JP | 07-085166 | 9/1995 |
| JP | 2004-238735 | 8/2004 |
| JP | 2005-505707 | 2/2005 |
| JP | 3616314 | 2/2005 |
| JP | 2005-060813 | 3/2005 |
| JP | 3713579 | 11/2005 |
| JP | 4058412 | 3/2008 |
| JP | 2008-115429 | 5/2008 |
| JP | 4144311 | 9/2008 |
| JP | 2009-209421 | 9/2009 |
| JP | 4506660 | 7/2010 |
| JP | 2011-105969 | 6/2011 |
| JP | 4715627 | 7/2011 |
| JP | 2013-091842 | 5/2013 |
| JP | 2014-501850 | 1/2014 |
| JP | 5556701 | 7/2014 |
| KR | 1020040040460 | 5/2004 |
| KR | 1020050012722 | 2/2005 |
| MX | PA02007562 | 7/2004 |
| MX | PA03005959 | 7/2004 |
| MX | PA04006156 | 11/2004 |
| MX | PA05007123 | 2/2006 |
| WO | WO 84/00563 | 2/1984 |
| WO | WO 88/03912 | 6/1988 |
| WO | WO 92/18422 | 10/1992 |
| WO | WO 94/00607 | 1/1994 |
| WO | WO 94/03649 | 2/1994 |
| WO | WO 95/11319 | 4/1995 |
| WO | WO 98/36102 | 8/1998 |
| WO | WO 98/39491 | 9/1998 |
| WO | WO 01/83835 | 11/2001 |
| WO | WO 02/27072 | 4/2002 |
| WO | WO 2004/029306 | 4/2004 |
| WO | WO 2004/079840 | 9/2004 |
| WO | WO 2006/013568 | 2/2006 |
| WO | WO 2007/071020 | 6/2007 |
| WO | WO 2007/071021 | 6/2007 |
| WO | WO 2008/139412 | 11/2008 |
| WO | WO 2009/158285 | 12/2009 |
| WO | WO 2011/010289 | 1/2011 |
| WO | WO 2011/100821 | 8/2011 |
| WO | WO 2011/156861 | 12/2011 |
| WO | WO 2012/000090 | 1/2012 |
| WO | WO 2012/005783 | 1/2012 |
| WO | WO 2012/149631 | 11/2012 |
| WO | WO 2012/158969 | 11/2012 |
| WO | WO 2012/174349 | 12/2012 |
| WO | WO 2013/044380 | 4/2013 |
| WO | WO 2013/049886 | 4/2013 |
| WO | WO 2013/090517 | 6/2013 |
| WO | WO 2013/148216 | 10/2013 |
| WO | WO 2013/173855 | 11/2013 |

OTHER PUBLICATIONS

International Search Report and Written Opinion for International (PCT) Patent Application No. PCT/US15/29039, dated Jul. 28, 2015 10 pages.
International Preliminary Report on Patentability for International (PCT) Patent Application No. PCT/US15/29039, dated Nov. 24, 2016 9 pages.
Official Action for Canadian Patent Application No. 2,949,061 dated Dec. 11, 2017, 5 pages.
Official Action for Canadian Patent Application No. 2,949,061 dated Oct. 12, 2018, 4 pages.
Notice of Allowance for Canadian Patent Application No. 2,949,061 dated Feb. 13, 2019, 1 page.

* cited by examiner

BRINE LEACHING PROCESS FOR RECOVERING VALUABLE METALS FROM OXIDE MATERIALS

CROSS-REFERENCE

The present application claims the benefits of U.S. Provisional Application Ser. No. 61/992,036 filed May 12, 2014 entitled "BRINE LEACHING PROCESS FOR RECOVERING VALUABLE METALS FROM OXIDE MATERIALS", the entire contents of which is incorporated herein by this reference.

FIELD

A method of recovering a valuable metal from a valuable metal-containing material is described. The method general describes recovering silver from a base metal-containing material. The valuable metal is recovered form the valuable metal-containing material at about a neutral pH value or at about a mildly basic pH value using a chloride-containing leaching solution. The valuable metal is generally silver and the valuable metal-containing material typically contains one or more base metals. The chloride-containing leaching solution dissolves at least most of the silver contained in the valuable metal-containing material but less than most of any one of the one or more base metals. The one or more base metals are commonly selected from the group consisting of lead, zinc and copper, more commonly one or more of lead and zinc.

BACKGROUND

Oxide ores and concentrates can have metallurgical properties complicating valuable metal recovery by hydrometallurgical processes, particularly by aqueous leaching processes. The recovery of silver from silver-containing ores having base metals, such as for example lead, and zinc, among others, can be complicated when the both of the silver and base metals are brought into solution during the leaching process.

Furthermore, some aqueous leaching processes can be expensive and can potentially present a severe environmental hazard if not properly controlled. For example, in direct cyanide leaching, cyanide is contacted with the ore or concentrate in the presence of molecular oxygen to dissolve the valuable metal and form a pregnant leach solution. Activated carbon can be employed to collect the dissolved valuable metal. Although effective, cyanide leaching can be expensive and, if not properly controlled, is extremely hazardous.

In another process, the ore or concentrate is contacted with a hot agitated chloride lixiviant. A typical lixiviant solution includes about 200 g/L sodium chloride, 10 g/L ferric iron, and 10 g/L HCl. The lixiviant dissolves not only silver but also lead, zinc, tin, and other base metals. Separation of the various dissolved metal species can be expensive and difficult. Additional expense is incurred by the use of an acidic solution containing hydrochloric acid and elevated process solution temperatures. Moreover, the elevated temperature and high hydrochloride acid concentration present an environmental hazard.

SUMMARY

Various aspects, embodiments, and configurations of the present disclosure address these and other needs. The present disclosure is related to an aqueous solution, particularly to an aqueous solution containing a halide for leaching a valuable metal, such as silver, from a valuable metal-containing material. The valuable metal-containing material can contain one or more base metals, such as but not limited to lead, zinc and copper.

Generally, the valuable metal-containing material can have from about 20 to about 200 g/tonne of silver. More generally, the valuable metal-containing material can have from about 50 to about 150, even more generally from about 80 to about 110, or yet even more generally from about 88 to about 100 g/tonne of silver.

Typically, the valuable metal-containing material can have from about 0.01 to about 2.0 wt. % sulfide ($S^{2-}$). More typically, the valuable metal-containing material can have from about 0.05 to about 1.0 wt. %, even more typically from about 0.1 to about 0.5 wt. %, or yet even more typically from about 0.2 to about 0.3 wt. % sulfide ($S^{2-}$).

Commonly, the valuable metal-containing material can have from about 0.01 to about 0.5 wt. % copper. More commonly, the valuable metal-containing material can have from about 0.03 to about 0.2 wt. %, even more commonly form about 0.05 to about 0.08, or yet even more commonly from about 0.01 to about 002 wt. % copper.

Typically, the valuable metal-containing material can have from about 0.5 to about 18 wt. % iron. More typically, the valuable metal-containing material can have from about 1 to about 12 wt. %, even more commonly from about 3 to about 10 wt. %, or yet even more commonly from about 5 to about 7 wt. % iron.

Generally, the valuable metal-containing material can have from about 0.05 to about 2.0 wt. % of manganese. More generally the valuable metal-containing material can have from about 0.1 to about 1.5 wt %, even more generally from about 0.2 to about 1.0 wt. %, or yet even more generally 0.3 to about 0.5 wt. % manganese.

Typically, the valuable metal-containing material can have from about 0.05 to about 2.0 wt. % of lead. More typically the valuable metal-containing material can have from about 0.1 to about 1.5 wt %, even more typically from about 0.2 to about 1.0 wt. %, or yet even more typically 0.3 to about 0.5 wt. % lead.

Commonly, the valuable metal-containing material can have from about 0.01 to about 1.0 wt. % of zinc. More commonly, the valuable metal-containing material can have from about 0.05 to about 0.4 wt. %, even more commonly from about 0.08 to about 0.25 wt. %, or yet even more commonly form about 0.1 to about 0.2 wt. % zinc.

The aqueous solution can contain an alkali and/or alkaline earth metal halide. The alkali metal can be lithium, sodium, potassium, rubidium, cesium, francium or a mixture thereof. Generally, the alkali metal can be lithium, sodium, potassium, cesium or a mixture thereof. More generally, the alkali metal can be lithium, sodium, potassium or a mixture thereof, even more generally the alkali metal can be sodium, potassium or a mixture thereof, yet even more generally the alkali metal can be sodium. The alkaline earth metal can be magnesium, calcium, strontium, barium or a mixture thereof. Typically, the halide can be fluoride, chloride, bromide, iodide or a mixture thereof. More typically the halide can be chloride, bromide, iodide or a mixture thereof, even more typically halide can be chloride, bromide or a mixture thereof, yet even more typically halide can be chloride. Usually, the aqueous solution can contain from about 50 to about 400 g/L of the alkali and/or alkaline earth metal halide. More usually, the aqueous solution can contain from about 100 to about 300 g/L, even more usually from about 150 to about 250 g/L, or yet even more usually from about 150 to about 225 g/L of alkali and/or alkaline metal halide. Still yet even more usually the aqueous solution can contain about 150 g/L of the alkali and/or alkaline earth metal halide. Yet still even more usually the aqueous solution can contain about 200 g/L of the alkali and/or alkaline earth metal halide.

In accordance with some embodiments is a process that includes contacting a metal-containing material comprising silver and a base metal with an aqueous solution. Furthermore, the aqueous solution can contain an oxidant. Typically, the aqueous solution can have a solution pH of about pH 6 or more during the contacting with the metal-containing material. The process can include contacting the aqueous solution with the metal-containing material to dissolve the silver into a pregnant leach solution while maintaining 50 wt. % or more of the base metal in the metal-containing material. The process can include recovering the dissolved silver from the pregnant leach solution.

In some embodiments, the halide can be chloride. In accordance with some embodiments, during the contacting of the metal-containing material and the aqueous solution, the aqueous solution can have a solution pH from about pH 6.0 to about pH 10.5. Moreover, during the contacting of the metal-containing material and the aqueous solution, the aqueous solution can have a solution pH from about pH 7 to about pH 9.

In some embodiments, the metal-containing material and aqueous solution can be at ambient temperature during the contacting of the metal-containing material and aqueous solution. Moreover, during the contacting of the metal-containing material and aqueous solution, the metal-containing material and aqueous solution can have a temperature from about 30 to about 110 degrees Fahrenheit. Furthermore, during the contacting of the metal-containing material and aqueous solution, the metal-containing material and aqueous solution can have a temperature from about 40 to about 100 degrees Fahrenheit.

In accordance with some embodiments, during the contacting step the aqueous solution can have an oxidation/reduction potential from about 550 to about 1,200 mV, as measured with a Pt—Ag/AgCl electrode in saturate KCl. Moreover, during the contacting step the aqueous solution can have an oxidation/reduction potential from about 850 to about 1,000 mV, as measured with a Pt—Ag/AgCl electrode in saturate KCl.

In some embodiments, the base metal can comprise one of lead, zinc, copper or a mixture thereof. Furthermore, the contacting of the aqueous solution with the metal-containing material to dissolve the silver into the pregnant leach solution can include maintaining more than 80 wt. % of the base metal in the metal-containing material. Moreover, the contacting of the aqueous solution with the metal-containing material to dissolve the silver into the pregnant leach solution can include maintaining more than 80 wt. % of the lead, zinc, copper or a mixture thereof in the metal-containing material.

In some embodiments, the base metal can be one of lead and zinc, or a mixture thereof. Furthermore, the contacting of the aqueous solution with the metal-containing material to dissolve the silver into the pregnant leach solution can include maintaining more than 85 wt. % of the base metal in the metal-containing material. Moreover, the contacting of the aqueous solution with the metal-containing material to dissolve the silver into the pregnant leach solution can include maintaining more than 85 wt. % of the lead, zinc, or a mixture thereof in the metal-containing material.

Furthermore, in some embodiments the oxidant can be $OCl^-$.

In accordance with some embodiments, the recovery of the silver can include the sub-step of precipitating the silver as silver sulfide.

In some embodiments, the aqueous solution can have from about 150 to about 250 g/L of the alkali and/or alkaline earth metal halide. The halide can be selected from the group consisting of chloride, bromide, iodide, or a mixture thereof.

In accordance with some embodiments is a process of contacting a silver-containing material having one or more base metals with an aqueous solution having a halide-containing oxidant and an alkali and/or alkaline earth metal chloride. The aqueous solution can have in some embodiments a solution pH from about pH 6.5 to about pH 10.5 during the contacting of the silver-containing material with the aqueous solution. Moreover, in some embodiments, the contacting of the silver-containing material with the aqueous solution can dissolve about 50 wt. % or more of the silver in the silver-containing material into a pregnant leach solution. In some embodiments, the contacting of the silver-containing material with the aqueous solution can maintain in the silver-containing material about 50 wt. % or more of the one or more base metals in the silver-containing material. In accordance with some embodiments, the process can include recovering the dissolved silver from the pregnant leach solution.

In some embodiments, the aqueous solution can have a solution pH from about pH 6.5 to about pH 9 during the contacting of the silver-containing material. Moreover, during the contacting of the silver-containing material and aqueous solution, the silver-containing material and the aqueous solution can be at ambient temperature. Furthermore, during the contacting of the silver-containing material and aqueous solution, the silver-containing material and the aqueous solution can have a temperature from about 30 to about 110 degrees Fahrenheit. In some embodiments, during the contacting of the silver-containing material and aqueous solution, the silver-containing material and the aqueous solution can have a temperature from about 40 to about 100 degrees Fahrenheit.

In accordance with some embodiments, during the contacting step the aqueous solution can have an oxidation/reduction potential from about 550 to about 1,200 mV, as measured with a Pt—Ag/AgCl electrode in saturate KCl. Moreover, during the contacting step the aqueous solution can have an oxidation/reduction potential from about 850 to about 1,000 mV, as measured with a Pt—Ag/AgCl electrode in saturate KCl.

In some embodiments, more than about 80 wt. % of the silver in the silver-containing material can be dissolved into the pregnant leach solution. Furthermore, in some embodiments, the base metal can be one of lead, zinc, copper or a mixture thereof. In accordance with some embodiments, the contacting of the aqueous solution with the silver-containing material to dissolve more than about 80 wt. % of the silver in the silver containing material into the pregnant leach solution can include maintaining more than about 80 wt. % of the lead, zinc, or a mixture thereof in the silver-containing material in the silver-containing material.

Moreover, in some embodiments the oxidant can be $OCl^-$.

In accordance with some embodiments, the recovery of the silver can include the sub-step of precipitating the silver as silver sulfide.

In some embodiments, the aqueous solution can have from about 150 to about 250 g/L of the alkali and/or alkaline earth metal halide.

In accordance with some embodiments is a process of contacting a silver-containing material having silver oxide and one or more of lead and zinc base metals with an aqueous solution. The aqueous solution can have an alkali and/or alkaline earth metal chloride and a halide-containing oxidant. Moreover, the aqueous solution can have, in some embodiments, a solution pH from about pH 6.5 to about pH 10.5 during the contacting of the silver-containing material with the aqueous solution. Moreover, in some embodiments, the contacting of the silver-containing material with the aqueous solution can dissolve 50 wt. % or more of the silver in the silver-containing material into a pregnant leach solution, while dissolving no more than about 15 wt. % of each of the one or more of lead and zinc base metals into the pregnant leach solution. Furthermore, the process can include, in some embodiments, recovering the dissolved silver from the pregnant leach solution.

Furthermore, during the contacting of the silver-containing material and aqueous solution, the silver-containing material and the aqueous solution can have a temperature from about 30 to about 110 degrees Fahrenheit. In some embodiments, during the contacting of the silver-containing material and aqueous solution, the silver-containing material and the aqueous solution can have a temperature from about 40 to about 100 degrees Fahrenheit.

In accordance with some embodiments, during the contacting of the aqueous solution and the silver-containing material, the aqueous solution can have an oxidation/reduction potential from about 550 to about 1,200 mV, as measured with a Pt—Ag/AgCl electrode in saturate KCl. Moreover, during the contacting of the aqueous solution and the silver-containing material, the aqueous solution can have an oxidation/reduction potential from about 850 to about 1,000 mV, a measured with a Pt—Ag/AgCl electrode in saturate KCl.

In some embodiments, more than about 80 wt. % of the silver in the silver-containing material can be dissolved into the pregnant leach solution. Furthermore, in some embodiments, the base metal can be one of lead, zinc, copper or a mixture thereof. In accordance with some embodiments, more than about 80 wt. % of the base metal can be maintained in the metal-containing material.

Moreover, in some embodiments the oxidant can be $OCl^-$.

In accordance with some embodiments, the recovery of the silver can include the sub-step of precipitating the silver as silver sulfide.

In some embodiments, the aqueous solution can have from about 150 to about 250 g/L of the alkali and/or alkaline earth metal halide.

In accordance with some embodiments is a system having a means for contacting a metal-containing material having silver and a base metal with an aqueous solution. The aqueous solution can have an oxidant and an alkali and/or alkaline earth metal halide. In some embodiments, the aqueous solution can have a solution pH of about pH 6 or more during the contacting of the metal-containing material and the aqueous solution. Moreover, the contacting of the aqueous solution and the metal-containing material can dissolve, in some embodiments, the silver into a pregnant leach solution while maintaining about 50 wt. % or more of the base metal in the metal-containing material. Furthermore, in some embodiments, the system can include a means for recovering the dissolved silver from the pregnant leach solution. The means for contacting can be one or more of mechanically mixing, mechanically stirring, vortex mixing, quiescent mixing, rotational agitation, current-current flow and combinations thereof. The means for recovering the dissolved silver can be one or more of cementation, precipitation, electrochemical, phrase transfer, and combinations thereof.

In accordance with some embodiments, the process can include the steps:

(a) contacting a valuable metal-containing material with an aqueous solution and/or an aqueous solution comprising an alkali and/or alkaline earth metal halide and a halide-containing oxidant to dissolve the valuable metal in the valuable metal-containing material into a pregnant leach solution; and (b) recovering the dissolved valuable metal from the pregnant leach solution.

In some embodiments, the process can include the steps:

(a) contacting a valuable metal-containing material containing one or more base metals with an aqueous solution having a pH value from about pH 6 to about pH 10.5 and comprising an alkali and/or alkaline earth metal halide and a halide-containing oxidant to dissolve more than about 24 wt. % the valuable metal in the valuable metal-containing material into a pregnant leach solution and less than about 15 wt. % of each of the one or more base metals; and (b) recovering the dissolved silver from the pregnant leach solution.

In some embodiments, the process can include the steps:

(a) contacting a silver-containing material with an aqueous solution having a pH from about pH 7.1 to about pH 10 comprising an alkali and/or alkaline earth metal halide and a halide-containing oxidant to dissolve the silver in the silver-containing material into a pregnant leach solution; and (b) recovering the dissolved silver from the pregnant leach solution.

The alkali and/or alkaline earth metal halide can be any chloride-containing, $Cl^-$, salt.

In some embodiments, the process can include the steps:

(a) contacting a silver-containing material having one or more base metals with an aqueous solution having a pH from about pH 7.1 to about pH 10 comprising an alkali and/or alkaline earth metal halide and a halide-containing oxidant to dissolve more than about 25 wt. % of the silver and no more than about 15 wt. % of any one of one or more base metals in the silver-containing material into a pregnant leach solution; and (b) recovering the dissolved silver from the pregnant leach solution.

In some embodiments of the disclosure, the alkali and/or alkaline earth metal halide can be any chloride-containing, $Cl^-$, salt.

In some embodiments of the disclosure, the aqueous solution generally can have at a solution pH from about pH 6 to about pH 10. More generally the aqueous solution can have a solution pH from pH 7 to about pH 10, even more generally from about pH 7.1 to about pH 10, yet even more generally from about pH 7.1 to about pH 9, still yet more generally from about 7.1 to about pH 8.8, still yet more generally from about pH 7.2 to about pH 8.5, and yet still more generally from about pH 7.2 to about pH 8.

In some embodiments of the disclosure, the contacting of the valuable metal-containing material with the aqueous solution typically can dissolve more than about 25 wt. % of the valuable metal in the valuable metal-containing material into the pregnant leach solution. More typically, the contacting of the valuable metal-containing material with the aqueous solution can dissolve more than about 45 wt. % of the valuable metal, even more typically more than 50 wt. %, even more typically more than about 60 wt. %, yet even more typically more than about 70 wt. %, still yet more typically more than about 80 wt. %, or yet still more typically more than about 90 wt. % of valuable metal contained in the valuable metal-containing metal.

In some embodiments of the disclosure, the valuable metal-containing material can contain one or more base metals. The one or more base metals can be iron, lead, zinc and copper. Typically, the one or more base metals can be iron, lead and zinc.

In some embodiments of the disclosure, the contacting of the valuable metal-containing material with the aqueous solution can dissolve no more than about 15 wt. % of any one of the one or more base metals contained in the valuable metal-containing material. Generally, the contacting of the valuable metal-containing material with the aqueous solution can dissolve no more than about 10 wt. % of any one of the one or more base metals contained in the valuable metal-containing material.

In some embodiments of the disclosure, the contacting of the valuable metal-containing material with the aqueous solution can dissolve no more than about 15 wt. % of each of the one or more base metals contained in valuable metal-containing material. Moreover, in some embodiments, the contacting of the valuable metal-containing material with the aqueous solution can dissolve no more than about 10 wt. % of each of the one or more base metals contained in the valuable metal-containing material.

Typically, in some embodiments, the contacting of the valuable metal-containing material with the aqueous solution can dissolve no more than about 15 wt. % of the lead contained in the valuable metal-containing material, more typically no more than about 10 wt. % of the lead contained in the valuable metal-containing material.

Commonly, in some embodiments, the contacting of the valuable metal-containing material with the aqueous solution can dissolve no more than about 15 wt. % of the zinc contained in the valuable metal-containing material, more commonly no more than about 10 wt. % of the zinc contained in the valuable metal-containing material.

Generally, in some embodiments, the contacting of the valuable metal-containing material with the aqueous solution can dissolve no more than about 15 wt. % of the iron contained in the valuable metal-containing material, more commonly no more than about 10 wt. % of the iron contained in the valuable metal-containing material.

Moreover, in some embodiments, the contacting of the aqueous solution with the valuable metal-containing material can dissolve the valuable metal in the valuable metal-containing material into a pregnant leach solution while maintaining at least most of the one or more base metals contained in the valuable metal-containing material. Generally, about 85 weight % or more of the zinc contained in the valuable metal-containing can be maintained in valuable metal-containing material, that is less than about 15 weight % of the zinc contained in the valuable metal-containing material can be dissolved into the pregnant leach solution. More generally, about 90 weight % or more of the zinc contained in the valuable metal-containing can be maintained in valuable metal-containing material, that is about 10 weight % or less of the zinc contained in the valuable metal-containing material can be dissolved into the pregnant leach solution. Even more generally, less than about 10 weight % of the zinc contained in the valuable metal-containing material can be dissolved into the pregnant leach solution.

Typically, about 85 weight % or more of the lead contained in the valuable metal-containing can be maintained in valuable metal-containing material; that is less than about 15 weight % of the lead contained in the valuable metal-containing material can be dissolved into the pregnant leach solution. More typically, about 90 weight % or more of the lead contained in the valuable metal-containing can be maintained in silver-containing material, that is 10 weight % or less of the lead contained in the silver-containing material can be dissolved into the pregnant leach solution. Even more typically, less than about 10 weight % of the lead contained in the valuable metal-containing material can be dissolved into the pregnant leach solution.

Generally, about 85 weight % or more of the iron contained in the valuable metal-containing can be maintained in valuable metal-containing material; that is less than about 15 weight % of the iron contained in the valuable metal-containing material can be dissolved into the pregnant leach solution. More typically, about 90 weight % or more of the iron contained in the valuable metal-containing can be maintained in silver-containing material, that is 10 weight % or less of the iron contained in the silver-containing material can be dissolved into the pregnant leach solution. Even more typically, less than about 10 weight % of the iron contained in the valuable metal-containing material can be dissolved into the pregnant leach solution.

In some embodiments of the disclosure, the contacting of the silver-containing material with the aqueous solution can dissolve no more than about 15 wt. % of any one of the one or more base metals contained in the silver-containing material. Generally, in some embodiments, the contacting of the silver-containing material with the aqueous solution dissolves no more than about 10 wt. % of any one of the one or more base metals contained in the silver-containing material.

In some embodiments of the disclosure, the contacting of the silver-containing material with the aqueous solution can dissolve no more than about 15 wt. % of each of the one or more base metals contained in silver-containing material. Typically, the contacting of the silver-containing material with the aqueous solution can dissolve no more than about 10 wt. % of each of the one or more base metals contained in the silver-containing material.

Typically, the contacting of the silver-containing material with the aqueous solution can dissolve no more than about 15 wt. % of the lead contained in the silver-containing material, more typically no more than about 10 wt. % of the lead contained in the silver-containing material.

Commonly, the contacting of the silver-containing material with the aqueous solution can dissolve no more than about 15 wt. % of the zinc contained in the silver-containing material, more commonly no more than about 10 wt. % of the zinc contained in the silver-containing material.

Generally, the contacting of the silver-containing material with the aqueous solution can dissolve no more than about 15 wt. % of the iron contained in the silver-containing material, more commonly no more than about 10 wt. % of the iron contained in the silver-containing material.

Moreover, the contacting of the aqueous solution with the silver-containing material can dissolve the silver in the silver-containing material into a pregnant leach solution while maintaining at least most of the one or more base metals in the silver-containing material. Generally, about 85 weight % or more of the zinc contained in the silver-containing can be maintained in silver-containing material, that is less than about 15 weight % of the zinc contained in the silver-containing material can be dissolved into the pregnant leach solution. More generally, about 90 weight % or more of the zinc contained in the silver-containing can be maintained in silver-containing material, that is about 10 weight % or less of the zinc contained in the silver-containing material can be dissolved into the pregnant leach solution. Even more generally, less than about 10 weight % of the zinc contained in the silver-containing material can be dissolved into the pregnant leach solution.

Typically, 85 weight % or more of the lead contained in the silver-containing can be maintained in silver-containing material, that is less than about 15 weight % of the lead contained in the silver-containing material can be dissolved into the pregnant leach solution. More typically, about 90 weight % or more of the lead contained in the silver-containing can be maintained in silver-containing material, that is about 10 weight % or less of the lead contained in the silver-containing material can be dissolved into the pregnant leach solution. Even more typically, less than about 10 weight % of the lead contained in the silver-containing material can be dissolved into the pregnant leach solution.

Generally, 85 weight % or more of the iron contained in the silver-containing can be maintained in silver-containing material, that is less than about 15 weight % of the iron contained in the silver-containing material can be dissolved into the pregnant leach solution. More typically, about 90 weight % or more of the iron contained in the silver-containing can be maintained in silver-containing material, that is about 10 weight % or less of the iron contained in the silver-containing material can be dissolved into the pregnant leach solution. Even more typically, less than about 10 weight % of the iron contained in the silver-containing material can be dissolved into the pregnant leach solution.

The aqueous solution typically can include from about 150 to about 250 g/L of the alkali and/or alkaline earth metal halide. More typically, the aqueous solution can contain from about 175 to about 225 g/L of the alkali and/or alkaline earth metal halide. Even more typically, the aqueous solution can contain about 200 g/L of the alkali and/or alkaline earth metal halide.

The contacting of the silver-containing material with the aqueous solution is typically at about an ambient temperature. The ambient temperature is generally from about 30 to about 110 degrees Fahrenheit, more generally from about 40 to about 100 degrees Fahrenheit, even more generally from about 45 to about 95 degrees Fahrenheit, or yet even more generally from about 50 to about 90 degrees Fahrenheit.

The aqueous solution typically has an oxidation/reduction potential when contacting the silver-containing material. The oxidation/reduction potential of the aqueous solution during the contacting step can be about 550 mV or higher but no more than about 1,200 mV (as measured with a Pt—Ag/AgCl electrode in saturate KCl). Generally, the oxidation/reduction potential of the aqueous solution and/or the aqueous lixivant solution can be from about 600 to about 1,150 mV, more generally from about 700 to about 1,100 mV, even more generally from about 800 to about 1,050 mV, yet even more generally from about 850 to about 1,000 mV, or even yet more generally from about 890 to about 950 mV (as measured with a Pt—Ag/AgCl electrode in saturate KCl).

During the contacting step, the oxidation/reduction potential of the aqueous solution and/or aqueous lixivant solution can be from about 600 to about 1,000 mV (as measured with a Pt—Ag/AgCl electrode in saturate KCl) and can have usage level of NaOCl in the aqueous solution from about 6 to about 8 Kg/tonne of the silver-containing material.

The silver-containing material can be comminuted to a silver-containing material grind size. The silver-containing material grind size can be typically from about 35 to about 65 $P_{80}$ μm, more typically from about 40 to about 60 $P_{80}$ μm, or 45 to about 55 $P_{80}$ μm, even more typically from about 47 to about 53 $P_{80}$ μm, or yet even more typically about 50 $P_{80}$ μm.

One or more of a slurry and a suspension having a % solids pulp density can be formed by contacting the aqueous solution and/or aqueous lixivant solution with the silver-containing material. Generally, the one or more of the slurry and suspension can have from about 30 to about 65% solids pulp density, more generally from 35 to about 60% solids pulp density, even more generally from about 40 to about 55% solids pulp density, or yet even more generally from 45 to about 50% solids pulp density. In some embodiments, the one or more of the slurry and the suspension can have a pulp density of about 45% solids pulp density.

The halide-containing oxidant can be an oxy-halide such as one of $OCl^-$, $OBr^-$, $OI^-$, or a mixture thereof. In some embodiments, the halide-containing oxidant can be $OCl^-$. In some embodiments of the disclosure the halide-containing oxidant can be NaOCl. The ratio of the halide-containing oxidant to silver-containing material can be typically from about 815 to about 1,025 kg/tonne, more typically from about 830 to about 1,000 kg/tonne, even more typically from about 855 to about 975 kg/tonne, 890 to about 950 kg/tonne.

It can be appreciated that when NaOCl is the oxidant being utilized in the aqueous solution and/or aqueous lixivant solution, those of skill in the art understand that when NaOCl is added to water the NaOCl dissociates in $Na^+$ cation and $OCl^-$ anion. Moreover, the $OCl^-$ anion can form HClO at pH values of about pH 7, which similarly follows for $OBr^-$, $OI^-$, or mixture thereof.

The present disclosure can provide a number of advantages depending on the particular configuration. The brine leaching process described in this disclosure can provide a high level of silver recovery from base metal oxide, sulfide, and mixed oxide/sulfide ores and concentrates even when performed at ambient temperature and pressure. It can be agnostic to mineralogy of such ores and concentrates. It can have similar or superior recoveries to conventional cyanide leaching while being substantially less expensive and having few, if any, environmental risks. It can be configured to substantially avoid or inhibit dissolution of base metals, particularly lead, zinc, and iron, thereby avoiding the need to remove the dissolved base metals from solution. It can use readily available salt deposits and/or seawater as the leaching agent.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The "Merrill-Crowe process" refers to a process in which the pregnant leach solution is separated from the ore by methods such as filtration (e.g. horizontal leaf type clarifiers) and counter current decantation (CCD). Afterwards a very clear solution is achieved by using pre-coated filters applying diatomaceous earth. Oxygen is then removed by passing the solution through a vacuum de-aeration column. Zinc dust is added to the clarified, de-aerated solution which precipitates the gold and/or silver; zinc having a higher affinity for the lixiviant ion than gold and/or silver. The precipitate (mixed with zinc dust) is then filtered out of the solution, and the zinc dust and gold and/or silver are mixed with sulfuric acid to dissolve the zinc. The solution is filtered, and the remaining solids are smelted to a gold and/or silver bullion bar.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate an example of the present disclosure. This drawing, together with the description, explains the principles of the disclosure. The drawing simply illustrates a preferred and alternative example of how the disclosure can be made and used and is not to be construed as limiting the disclosure to only the illustrated and described example. Further features and advantages will become apparent from the following, more detailed, description of the various aspects, embodiments, and configurations of the disclosure, as illustrated by the drawing referenced below.

DETAILED DESCRIPTION

Figure 1:
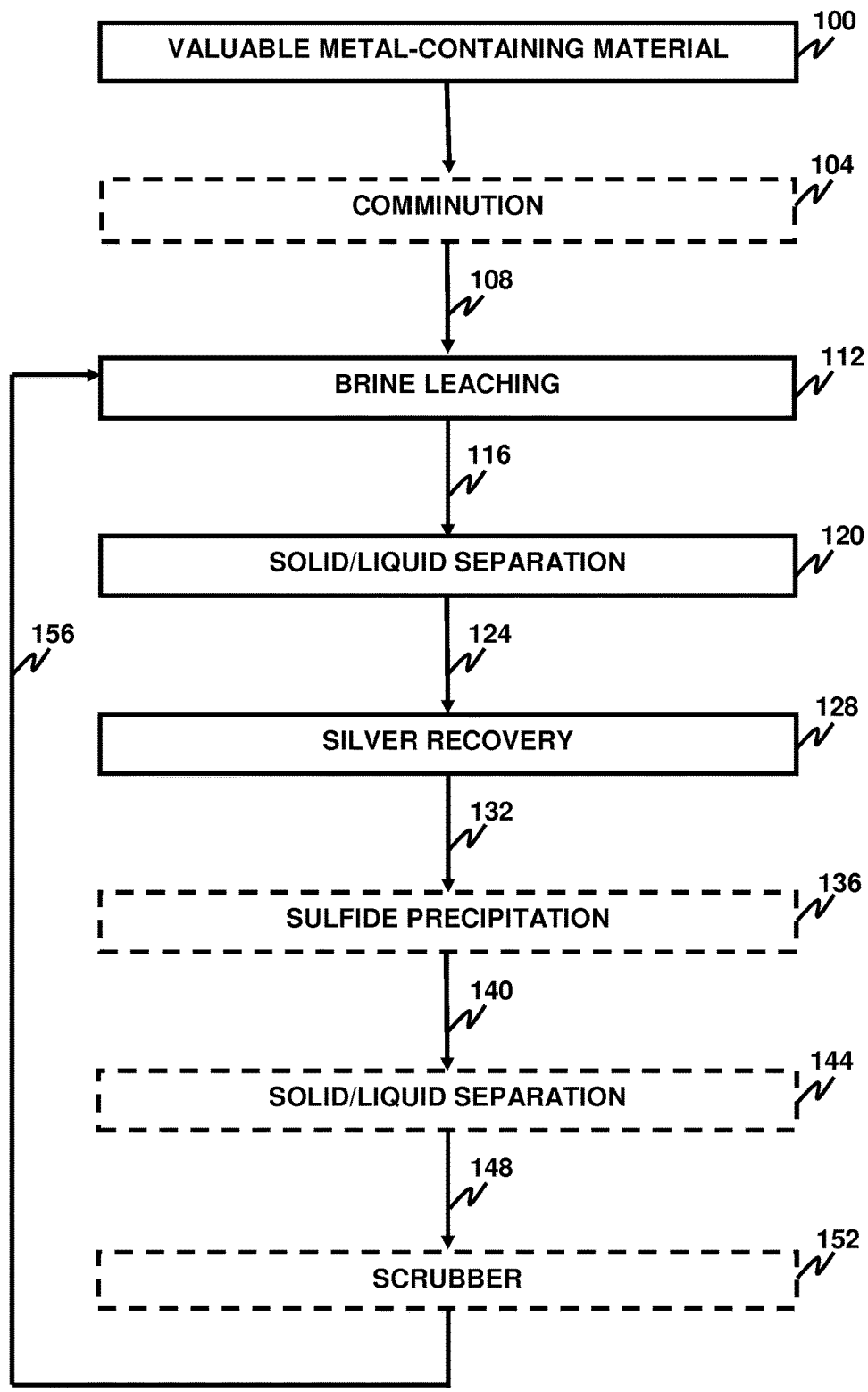
FIG. 1 is a flow chart of a process according to some embodiments of the disclosure.

A typical silver-containing mineral having the composition given in Table 1 was subjected to a standard cyanide leach process, a common acidic salt leach process and an aqueous salt solution leach process according to some of the embodiments described herein.

TABLE 1

| Ag g/tonne | Fe wt. % | Cu wt. % | Zn wt. % | Pb wt. % | S wt. % | $SO_4^{2-}$ wt. % | $S^{2-}$ wt. % |
|---|---|---|---|---|---|---|---|
| 114 | 5.73 | 0.0105 | 0.138 | 0.407 | 0.88 | 1.27 | 0.46 |

Table 2 summarizes the cyanide leach process parameters and the silver, the copper, zinc and lead recovered from the silver-containing mineral by the cyanide leach process. Table 3 summarizes the salt leach process parameters and the silver, iron, zinc and lead recovered from the silver-containing mineral by an acidic salt leach process (sample 30) and aqueous salt solution leach process (samples 31-33). Both the cyanide and acidic salt leaching processes leach substantial amounts of the base metals from the silver-containing mineral. The cyanide process leaches 34% of copper, 6% of the zinc and 17% of lead from the silver-containing

TABLE 2

| | Sample No. | | | |
|---|---|---|---|---|
| | 65 | 66 | 67 | 68 |
| General Setup | | | | |
| NaCN g/L | 5 | 5 | 5 | 0.5 |
| End of Run Information | | | | |
| pH | 11.4 | 11.2 | 11.1 | 11.0 |
| NaCN g/L | 4.36 | 1.61 | 0.75 | 0.40 |
| DO, ppm | 8.34 | 7.96 | 7.84 | 7.76 |
| NaCN consumption, kg/t | 2.83 | 1.27 | 0.75 | 0.32 |
| Metallurgical Balance, % | | | | |
| Cu | 88 | 86 | 94 | 96 |
| Zn | 96 | 91 | 94 | 93 |

TABLE 2-continued

| | Sample No. | | | |
|---|---|---|---|---|
| | 65 | 66 | 67 | 68 |
| Pb | 83 | 79 | 83 | 85 |
| Ag | 91 | 89 | 92 | 92 |
| Recovery, % | | | | |
| Ag calc'd head | 59 | 55 | 47 | 41 |
| Ag feed/residue | 63 | 60 | 52 | 46 |
| Cu feed/residue | 34 | 34 | 25 | 25 |
| Zn feed/residue | 6 | 11 | 8 | 8 |
| Pb feed/residue | 17 | 21 | 17 | 15 |

Solids feed: 200 grams;
Temperature: ambient;
Pulp density: 45% solids;
Grind size, $P_{80}$ 48 μm;
CaO requirement: 5.89 kg/t;

mineral. The acidic salt leach process (sample 30) also leaches substantial amount of the base metals from the silver-containing mineral. The acidic solution leaches 31% of the iron, 62% of the zinc and 57% of lead from the silver-containing mineral. It was surprising found that one or both of conducting the salt leach process at one or more of neutral and/or slightly basic pH and at ambient temperature substantially reduces level of base metals reporting to the leach solution while substantially maintaining the level silver reporting to the leach leach solution. The level of silver recovered in at a pH of about pH 7 in the salt leach process (sample 31-33) was respectively 70, 68 and 65%. Slightly less than the 74% recovered at pH 0.3. However, the level of iron, zinc and lead reporting to the leach solution respectively decreased from about 31% to about 3-7%, from about 62% to about 12-14% and from about 57% to about 7-11%. The decreased levels of base metals in the leach solution simplifies the silver recovery process, that is one or more eliminates the need to recover the one or more of base metals prior to recovering silver and recovering one or more of the base metals from the leach solution prior to sending the

TABLE 3

| | Sample No. | | | |
|---|---|---|---|---|
| | 30 | 31 | 32 | 33 |
| General Setup | | | | |
| Starting leach solution g/L | | | | |
| HCl | 10 | 0 | 0 | 0 |
| NaCl | 150 | 150 | 150 | 150 |
| Solids feed amount, g | 454.56 | 454.56 | 545.54 | 454.55 |
| Temp, ° C. | 50 | 50 | 50 | Amb. |
| End of Run Information | | | | |
| pH | 0.27 | 6.98 | 7.07 | 6.99 |
| Free acid, g/L HCl | 10.3 | 0 | 0 | 0 |
| emf, mV | 1,000 | 906 | 915 | 944 |
| 100% HCl used,[a] kg/t | 59.2 | 9.3 | 0.0 | 0.0 |
| 100% NaOH used, kg/t | 0 | 6.74 | 1.13 | 0.55 |
| 100% NaOCl used, kg/t | 13.3 | 58.0 | 7.9 | 7.0 |
| NaCl, kg/t | 141 | 117 | 157 | 158 |
| Metallurgical Balance, % | | | | |
| Fe | 94 | 93 | 95 | 97 |
| Zn | 87 | 87 | 89 | 89 |
| Pb | 87 | 89 | 93 | 93 |
| Ag | 88 | 86 | 88 | 87 |

TABLE 3-continued

| | Sample No. | | | |
|---|---|---|---|---|
| | 30 | 31 | 32 | 33 |
| Recovery, % | | | | |
| Ag calc'd head | 70 | 65 | 64 | 60 |
| Ag feed/residue | 74 | 70 | 68 | 65 |
| Fe feed/residue | 31 | 7 | 5 | 3 |
| Zn feed/residue | 62 | 14 | 12 | 13 |
| Pb feed/residue | 57 | 11 | 7 | 8 |

Pulp Density: 45.0% solids;
Grind size, $P_{80}$ 48 μm;
[a] 100% HCl used includes the acid in the lixiviant before the leach and the acid necessary to maintain the leach (not the acid used for re-pulping and washing).

silver-depleted leach solution to tailings. Furthermore, leaching at a neutral and/or neutral pH substantially eliminates the environmental and health hazards of operating at low pH. Furthermore, operating at a neutral and/or nearly neutral pH eliminates the need for acid resistance piping and tanks. Conducting salt leach process at ambient temperature also reduces environmental impact and hazards of handling and disposing of a high temperature acid solution.

In step 100 of FIG. 1 a valuable metal-containing material 100 is provided. The valuable metal-containing material can be any oxide, sulfide, or mixture of oxide and sulfide ores (whether oxide or sulfide dominant), concentrate, mine or mill tailings, calcine, and the like. It can include one or more valuable metals, such as silver and/or base metal(s). In some embodiments, the valuable metal-containing material 100 comprises silver and one or more base metals.

For example, the valuable metal-containing material 100 typically can include at least about 25 g/t, more typically at least about 50 g/t, and even more typically at least about 75 g/t but no more than typically about 1,500 g/t, more typically about 1,000 g/t, and even more typically about 750 g/t silver on the one hand and at least about 0.005 wt. %, more typically at least about 0.01 wt. %, and even more typically at least about 0.1 wt. % but no more than typically about 30 wt. %, more typically about 25 wt. %, and even more typically about 15 wt. % of base metals, both individually and collectively, on the other.

In some configurations, the valuable metal-containing material 100 contains from about 70 to about 110 g/t silver. Typically, the valuable metal-containing material can have from about 0.01 to about 0.7 wt. % sulfide ($S^{2-}$). Commonly, more than about 50 wt. % of the silver in the valuable metal-containing material 100 is acanthite ($Ag_2S$). More commonly, more than about 80 wt. % of the silver in the valuable metal-containing material 100 is acanthite ($Ag_2S$).

Typically, the one or more base metals comprise iron, lead, zinc, nickel, manganese, copper, chromium, and cobalt. Moreover, the valuable metal-containing material 100 can contain from about 10 to about 2 wt. % iron, from about 0.2 to about 0.5 wt. % lead and from about 0.1 to about 0.15 wt. % zinc. The manganese content of the valuable metal-containing material 100 can be from about 0.01 to about 0.6 wt. %. The copper content can be from about 0.01 to about 20 wt. %; the chromium content can be from about 0.001 to about 1.0 wt. %; and the cobalt content can be from about 0.001 to about 1.0 wt. %.

In optional step 104, a crusher and/or mill can comminute the valuable metal-containing material 100. The comminuted valuable metal-containing material can have a desired particle size distribution. As will be appreciated, the particle size distribution can be dependent on the mineralogy of the valuable metal-containing material 100. Moreover, the particle size distribution is generally selected to achieve exposure of the valuable metals contained within the valuable metal-containing material mineral matrix. When the valuable metal comprises silver, the comminution of the valuable metal-containing material exposures at least some, if not at least most, of the silver contained within the valuable metal-containing material.

In some embodiments, the $P_{80}$ size of the comminuted valuable metal-containing material 108 is typically no more than about 500 microns, more typically no more than about 250 microns, more typically no more than about 200 microns, and even more typically no more than about 150 microns.

In step 112, the valuable metal-containing material 100 or comminuted valuable metal-containing material 108, as the case may be, is contacted in with an aqueous solution. The aqueous solution can be an aqueous lixivant solution. The aqueous solution can comprise an alkali and/or alkaline earth metal halide and an oxidant. It can be appreciated that the valuable metal-containing material 100 or comminuted valuable metal-containing material 108 is generally suspended in the aqueous solution in the form of one or more of a slurry and/or a suspension 119. The contacting of the aqueous solution with the valuable metal-containing material 100 or comminuted valuable metal-containing material 108 typically dissolves the valuable metal into the aqueous solution to form a pregnant solution and a depleted valuable metal-containing material. When the valuable metal comprises silver, the contacting of the aqueous solution with the silver contained within the valuable metal-containing material 100 or the comminuted valuable metal-containing material 108 can dissolve the silver into the pregnant leach solution and form the silver-depleted valuable metal-containing material.

The alkali or alkaline earth metal halide can comprise a chloride salt such as, but not limited to, potassium chloride, sodium chloride or a mixture thereof. The oxidant can comprise molecular oxygen, ozone, a peroxygen compound (such as, but not limited to, hydrogen peroxide and perchlorate), a hypohalite (such as hypochlorite), a halogen (such as chlorine, $Cl_2$), chlorite, chlorate, and the like. It can be appreciated that the concentrations of alkali and/or alkaline earth metal halide and the oxidant are monitored and substantially maintained within the concentration ranges described herein during the contacting of the aqueous solution with the valuable metal-containing material 100 and/or comminuted valuable metal-containing material 108. The concentrations can be adjusted by one or more of the following: adding water to the aqueous solution (typically to lower the concentration of one or more of the alkali and/or alkaline earth halide and/or the oxidant); adding oxidant to the aqueous solution; adding one or both of alkali and alkaline earth halide; or a combination thereof.

The aqueous solution leaching can have a neutral, a pH value of about pH 7, or near neural acidic pH, such as a pH value from about pH 6 to about pH 7, or a near neural basic pH, such as a pH from about pH 9 to about pH 7, during the contacting of the valuable metal-containing material with the aqueous solution. A base material, such as an alkali or alkaline earth metal oxide or hydroxide or lime, which is a mixture of carbonates, oxides, and hydroxides and/or a mineral acid, such as HCl, HBr, HI, $H_2SO_4$ or $HNO_3$, or such, can be added to adjust the pH of the aqueous solution to a neutral or near neutral pH value.

The aqueous solution contacted with the valuable metal-containing material 100 and/or comminuted valuable metal-containing material 108 typically includes at least about 25 g/L, more typically at least about 50 g/L, and even more typically at least about 100 g/L but typically no more than about 750 g/L, more typically no more than about 500 g/L, more typically no more than about 400 g/L, and even more typically no more than about 300 g/L of the alkali or alkaline earth metal halide.

Moreover, the aqueous solution typically includes at least about 2.5 kg/tonne, more typically at least about 5 kg/tonne, and even more typically at least about 5.5 kg oxidant/tonne of material 100 kg/tonne but typically no more than about 250 kg/tonne, more typically no more than about 150 kg/tonne, and even more typically no more than about 100 kg oxidant/tonne of the valuable metal-containing material 100 and/or the comminuted valuable metal-containing material 108.

Typically, the aqueous solution can have a solution pH from about pH 6 to about pH 10. More typically the aqueous solution has a solution pH from pH 7 to about pH 10, even more typically from about pH 7.1 to about pH 10, yet even more typically from about pH 7.1 to about pH 9, still yet more typically from about pH 7.1 to about pH 8.8, still yet more typically from about pH 7.2 to about pH 8.5, and yet still more typically from about pH 7.2 to about pH 8. To realize any of these pH ranges, from about 0.25 to about 10 kg of a base material and/or base equivalent is added per tonne of the valuable metal-containing material 100 and/or comminuted valuable metal-containing material 108.

Although the aqueous solution can have any temperature during step 112, the temperature of the aqueous solution is typically at about ambient temperature. Moreover, the aqueous solution can have a temperature generally from about 30 to about 110 degrees Fahrenheit, more generally from about 40 to 100 degrees Fahrenheit, even more generally from about 45 to about 95 degrees Fahrenheit, or yet even more generally from about 50 to about 90 degrees Fahrenheit.

To avoid decomposition of sulfides into sulfuric acid, the oxidation/reduction potential ("ORP", or electromotive force) of the aqueous solution is typically no more than about 550 mV or higher but no more than about 1,200 mV (as measured with a Pt—Ag/AgCl electrode in saturate KCl). Generally, the oxidation/reduction potential of the aqueous solution is from about 600 to about 1,150 mV, more generally from about 700 to about 1,100 mV, even more generally from about 800 to about 1,050 mV, yet even more generally from about 850 to about 1,000 mV, or even yet more generally from about 890 to about 950 mV (as measured with a Pt—Ag/AgCl electrode in saturate KCl).

Compared to acidic salt leaching, a neutral and/or near neural basic pH leaching can avoid base metal removal and/or recovery; due to lower concentrations of dissolved base metal generated when leaching is conducted at the neutral and/or near neutral basic pH values. When leaching is conducted at an acidic pH value, base metals in the valuable metal-containing material can dissolve into the pregnant leach solution, thereby complicating silver recovery. For example, dissolving the valuable metal, such as silver, into the pregnant leach solution at a neutral and/or near neutral basic pH commonly dissolves no more than about 25 wt. %, more commonly no more than 20 wt. %, even more commonly no more than 15 wt. %, yet even more commonly no more than 10 wt. %, or still yet even more commonly no more than 5 wt. % of the one or more base metals, selectively or collectively into the pregnant leach solution.

In some embodiments, dissolving silver into the pregnant leach solution at a neutral and/or near neutral basic pH commonly dissolves no more than about 25 wt. %, more commonly no more than 20 wt. %, even more commonly no more than 15 wt. %, yet even more commonly no more than 10 wt. %, or still yet even more commonly no more than 5 wt. % of the one or more base metals selected from the group consisting of iron, zinc and lead, selectively or collectively. While silver recoveries may be lower compared to an acidic brine leaching pH, the elimination of dissolved base metal removal can be one or more of economically more beneficial, simply the silver recovery process, or a combination thereof.

It can be appreciated that, the contacting of aqueous solution with the valuable metal-containing material 100 or comminuted valuable metal-containing material 108 in step 112 forms one or more of a slurry and/or suspension 119 having a % solids pulp density. The one or more slurry and suspension % solids pulp density can depend on the application. Generally, the one or more of a slurry and/suspension 119 can have from about 30 to about 65% solids pulp density, more generally from 35 to 60% solids pulp density, even more generally from about 40 to about 55% solids pulp density, or yet even more generally from 45 to about 50% solids pulp density. In some embodiments, the one or more of a slurry and/suspension 119 has about 45% solids pulp density.

The contacting of the aqueous solution and/or the valuable metal from the valuable metal-containing material 100 and/or the comminuted valuable metal-containing material 108 can be performed at atmospheric pressure in one or more of an agitated or stirred tank or vat reactor or a heap. In some process configurations, contacting can be performed in cascading agitated vessels fabricated from corrosion resistant material(s) to withstand chloride and/or one or more of acid and base attack. Non-limiting examples of such corrosion resistant materials include rubber-lined tanks and/or tanks constructed with fiberglass reinforced plastic materials.

In some embodiments the process can include step 120, the one or more of the pregnant solution and the depleted valuable metal-containing material are subjected to solid/liquid separation. The solid/liquid separation can be effected by any suitable technique, such as filtration, hydrocycloning, decantation, gravity separation, and the like. The separation of the pregnant solution from the depleted valuable metal-containing material yields a separated pregnant solution 124 and separated metal-containing solids. The separated metal-containing solids can be sent directly to tailings or subjected to further processing to recover any remaining metals, such as any base metals contained in the separated metal-containing solids.

Step 120 can also include sending the separated pregnant solution 124 to a valuable metal recovery step 128. When the valuable metal is silver, step 128 can comprise a silver metal recovery process. Silver can be recovered in step 128 from the separated pregnant solution 124 by any suitable technique know within the art to form a lean solution 132 and a silver product (not shown) for subsequent processing, such as by furnace refining, to provide a purified silver product. Examples include cementation on a medium such as iron or zinc; precipitation; adsorption and/or absorption on carbon (such as Carbon-In-Leach) or resin (such as Resin-in-Leach); electrolysis; the Merrill-Crowe process; precipitation with a water soluble sulfide, such as without limitation sodium sulfide, lithium sulfide, or ammonium sulfide; and the like. The concentration of silver in the pregnant solution can be upgraded or increased by cycling the pregnant solution to step 112 before silver recovery (not depicted), by membrane filtration (e.g., reverse osmosis, leaky reverse osmosis, nanofiltration, etc.), and by other techniques.

In some embodiments, silver is cemented onto powdered iron or zinc at a pH typically ranging from about pH 0.5 to about pH 5 and more typically from about pH 1 to about pH 3. Iron or zinc reduces silver chloride. The silver cemented product is removed from the solution by thickening and filtration and washed to remove residual chloride. The cemented silver filter cake, which may contain lead sulfide, is further refined.

In some embodiments, process step 120 can include contacting the separated pregnant solution 124 with a deoxidizing agent (not depicted) to remove any of the oxidant (from the aqueous solution) contained in the separated pregnant solution 124. A non-limiting example of the deoxidizing agent is a peroxide containing material, such as hydrogen peroxide.

Some embodiments of process step 120 can include contacting the separated pregnant solution 124 with an alkali and/or alkaline earth salt of hydrogen sulfide (such as non-limiting examples of NaHS, LiHS, SrHS, $Ca(HS)_2$, $Mg(HS)_2$, and mixtures thereof). During the contacting of the separated pregnant solution 124 with the alkali and/or alkaline earth salt of hydrogen sulfide, the pH value of the separated pregnant solution 124 can be adjusted by contacted one or more of an acidic and a basic material with the separated pregnant solution 124. The contacting of the separated pregnant solution 124 with the alkali and/or alkaline earth hydrogen sulfide salt generally precipitates a silver sulfide material. The silver sulfide material typically comprises $Ag_2S$. The silver sulfide material can be separated from solution by any solid liquid separation process, as described herein, to form a separated silver sulfide material and a filtrate. The separated silver sulfide material can be further processed to obtain elemental silver metal. The filtrate can sent to one or more of tailings, such as to one or more of step 112 and step 152 (see below).

In some embodiments, the process can include step 136. In step 136, any dissolved base metals in all or part of the lean leach solution 132 are precipitated as sulfides to produce a barren leach solution 140 and precipitated base metal product (not shown). Precipitation of the base metal product can be performed by contacting the lean leach solution 132 with an alkali metal hydrosulfide typically at a pH of less than pH 7 and more typically ranging from about pH 4 to about pH 6.5. Other sulfides may be employed, such as hydrogen sulfide, ammonium sulfide, an alkali metal sulfide, or an alkaline earth metal polysulfide. The sulfide ion typically converts the water soluble and/or dissolved base metal chloride to a water insoluble base metal sulfide which generally precipitates out of the lean leach solution 132. Sufficient sulfide ion is provided to precipitate substantially all of the dissolved base metal. This concentration of sulfide ion typically ranges from about 100 to 150% of the stoichiometric amount relative to the dissolved base metal concentration. As will be appreciated, other techniques can be used to remove dissolved base metals, such as electrolysis.

In optional solid/liquid separation step 144, the barren leach solution 140 can be separated from the precipitated base metal product to form a separated barren leach solution 148 and a recovered base metal product (not depicted). Solid/liquid separation can be effected by any suitable technique, such as filtration, hydrocycloning, decantation, gravity separation, and the like. In one process configuration, the barren leach solution 140 is thickened and filtered to form a filter cake that is subsequently washed. A small stream of the sulfide precipitation thickener underflow can be recycled to the precipitation circuit as seed.

The separated barren leach solution 148 can be sent to an optional scrubbing step 152, while the recovered base metal product can be subjected to further processing (not depicted). In optional scrubbing step 152, the separated barren leach solution 148 can be circulated through a scrubber to scrub a plant to form an aqueous solution 156 (that is, an aqueous lixivant solution). The aqueous solution 156 is generally sent to step 112 for contacting with the valuable metal-containing material 100 or comminuted valuable metal-containing material 108, as the case may be. The processing of the separated barren leach solution 148 can produce a vent gas (not depicted). The vent gas can be processed to produce an off-gas suitable for discharge into the atmosphere (not depicted). The off-gas can be collected in one or more of the process steps discussed above and include a variety of contaminants (such as chlorine gas, sulfuric acid gas, etc.). In the scrubber, the separated barren leach solution 148 can be contacted with a base, such as an alkali metal hydroxide, to react with acid gas components.

The treated leach solution 156 is recharged with fresh halide, oxidant, and/or base, as needed. The recharged, treated leach solution 156 can be sent to step 112.

Silver is recovered in step 128 from the separated pregnant solution 124 by any suitable technique to form a lean solution 132 and a silver product (not shown) for subsequent processing, such as by furnace refining, to provide a purified silver product. Examples include cementation on a medium such as iron or zinc; precipitation; adsorption and/or absorption on carbon (such as Carbon-In-Leach) or resin (such as Resin-in-Leach); electrolysis; the Merrill-Crowe process; precipitation with a water soluble sulfide, such as sodium sulfide, lithium sulfide, or ammonium sulfide; and the like. The concentration of silver in the pregnant solution can be upgraded or increased by recycling the pregnant solution to step 112 before silver recovery, by membrane filtration (e.g., reverse osmosis, leaky reverse osmosis, nanofiltration, etc.), and by other techniques.

Examples

The following examples are provided to illustrate certain aspects, embodiments, and configurations of the disclosure and are not to be construed as limitations on the disclosure, as set forth in the appended claims. All parts and percentages are by weight unless otherwise specified.

The leaches of ore compositions I and II were performed in an agitated, 2 L baffled glass resin kettle with a lid and cold water condenser. Analysis of ore compositions I and II are given in Table 4. Silver was assayed was by atomic absorption (AA) and other metals were assayed by inductively coupled plasma emission spectroscopy (ICP-OES).

TABLE 4

| Ore | Ag (g/t) | $S^{2-}$ (wt. %) | Cu (wt. %) | Fe (wt. %) | Mn (wt. %) | Pb (wt. %) | Zn (wt. %) |
|---|---|---|---|---|---|---|---|
| I | 99.7 | 0.30 | 0.012 | 5.39 | 0.324 | 0.418 | 0.132 |
| II | 114 | 0.46 | 0.011 | 5.73 | 0.348 | 0.407 | 0.138 |

A thermometer and pH and electromotive force (emf), Ag/AgCl with saturated KCl) probes were used to maintain the selected conditions for each test. Small periodic samples were taken for kinetic evaluations, acid, and chlorine control over a six hour run time. During the experiments, NaOCl, NaOH, and/or acids were added to maintain the selected conditions. Typically, each test started with heating a predetermined amount of aqueous solution in the resin kettle and adding enough solid feed to make a 45 wt. % solid slurry. The aqueous NaCl solution was made specific for each test, and NaOCl was used to maintain the emf in the slurry at about 950 My (versus Ag/AgCl with saturated KCl). Two different sources of NaCl were tested. A sample of the residue was submitted for silver assay by atomic absorption (AA) and other metals by inductively coupled plasma emission spectroscopy (ICP-OES). The results of the various tests are shown in Tables 5-10.

Table 5 summarizes the general setup conditions, end of run information, metallurgical balance and percent recoveries for silver, iron, zinc and lead for valuable metal solids feed II. The leaching run times were about 6 hours, the pulp densities (valuable metal solids feed content during leaching process) were about 45.0% and the grind size of the valuable metal solids feed were about $P_{80}$ of 48 μm. Furthermore, the leaching temperature for Sample Run No. 73 was 50 degrees Celsius, while the leaching temperature for Sample Run Nos. 72 and 74-77 was ambient, which generally corresponds to about 20 to about 25 degrees Celsius. The level of chloride in the aqueous leaching solution ranged from about 150 grams to about 225 grams NaCl per liter.

Table 6 summarizes the general setup conditions, end of run information, metallurgical balance and percent recoveries for silver, iron, zinc and lead for valuable metal solids feed I. The leaching run times were about 6 hours, the pulp densities (valuable metal solids feed content during leaching process) were about 45.0%, the level of chloride in the aqueous solution was about 150 grams NaCl/L and the grind size of the valuable metal solids feed were about $P_{80}$ of 50 μm. Furthermore, the leaching temperature for Sample Run No. 79 was 50 degrees Celsius, while the leaching temperature for Sample Run Nos. 78 and 80-82 was ambient, which generally corresponds to about 20 to about 25 degrees Celsius.

Table 7 summarizes the general setup conditions, end of run information, metallurgical balance and percent recoveries for silver, iron, zinc and lead for valuable metal solids feed I. The leaching run times were about 6 hours, the level of chloride in the aqueous solution was about 150 grams NaCl/L, ambient leaching temperature, and the grind size of the valuable metal solids feed were about $P_{80}$ of 50 μm. The pulp densities (valuable metal solids feed content during leaching process) were about 45.0% for Sample Run Nos. 85, 89, 91, 97, 99, 91, 93 and 103, while Sample Run Nos. 87 and 105, respectively had pulp densities of 50.0 and 48.7%. The emf (or oxidation/reduction potential) ranged from about a low of 604 mV (Sample Run No. 105) to a high of 1,035 mV (Sample Run No. 85), while emf for the remaining samples (87, 89, 91, 93, 97, 99, 101 and 103) ranged from about 747 to about 989 mV.

Table 8 summarizes the general setup conditions, end of run information, metallurgical balance and percent recoveries for silver, iron, zinc and lead for valuable metal solids feed I. The leaching run times were about 6 hours, the level of chloride in the aqueous solution was about 200 grams NaCl/L, ambient leaching temperature, and the grind size of the valuable metal solids feed were about $P_{80}$ of 50 μm. The pulp densities (valuable metal solids feed content during leaching process) were about 45.0% for Sample Run Nos. 86, 90, 92, 94, 98, 100, 102 and 104, while Sample Run No. 88 had pulp density of 50.0%. The emf (or oxidation/reduction potential) ranged from about a low of 589 mV (Sample Run No. 102) to a high of 1,049 mV (Sample Run No. 86), while emf for the remaining samples (88, 90, 92, 94, 98, 100, 102 and 10) ranged from about 754 to about 958 mV.

Table 9 summarizes the general setup conditions, end of run information, metallurgical balance and percent recoveries for silver, iron, zinc and lead for valuable metal solids feed I. The leaching run times were about 6 hours, the chloride level in the aqueous solution was about 200 grams NaCl/L, ambient leaching temperature, and the grind size of the valuable metal solids feed were about $P_{80}$ of 74 μm. The pulp densities (valuable metal solids feed content during leaching process) were about 45.0% for Sample Run Nos. 95 and 96. The emf (or oxidation/reduction potential) ranged from about a low of 918 mV (Sample Run No. 96) to a high of 942 mV (Sample Run No. 95).

Table 10 summarizes the general setup conditions, end of run information, metallurgical balance and percent recoveries for silver, iron, zinc and lead for valuable metal solids feed I. The leaching run times were about 6 hours, the level of chloride in the aqueous solution was about 200 grams NaCl/L, ambient leaching temperature, and the grind size of the valuable metal solids feed were about $P_{80}$ of 50 μm. The pulp densities were 45% solids. The emf (or oxidation/reduction potential) ranged from about a low of 884 mV to about 921 mV. Samples 113, 114 and 118-120 were recycle studies.

Figure 2:
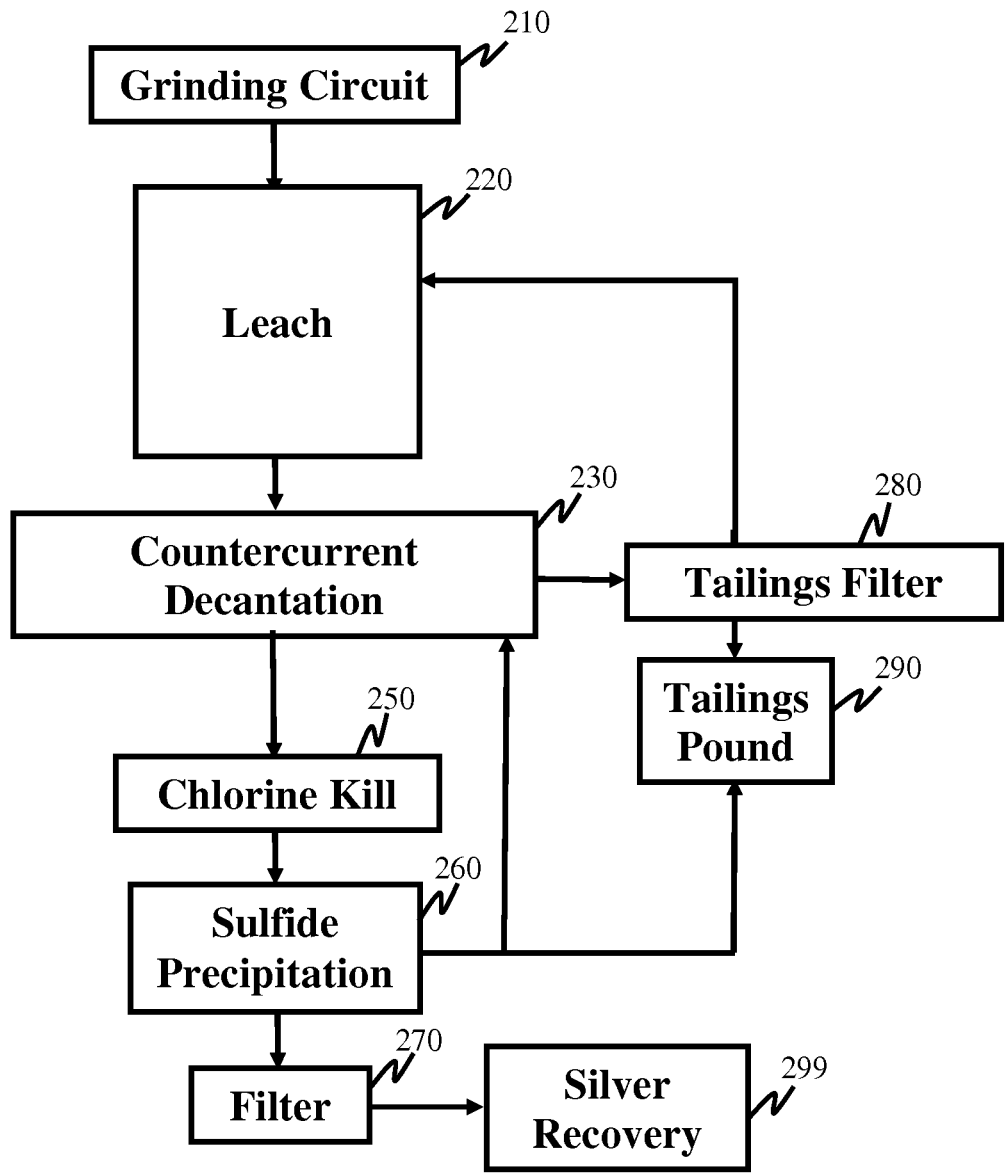
FIG. 2 is a flow chart of a process according to some embodiment of the disclosure.

FIG. 2 depicts an embodiment of the brine leaching process according to some embodiments of the present disclosure. In step 210, the valuable metal-containing material is provided and, if necessary, is crushed and/or milled to form a comminuted valuable-metal containing material 108. It can be appreciated that the valuable metal-containing material contains silver.

In the crushing and/or milling process oversized rock can be broken by a manually operated pick to pass through a grizzly. The undersized rock can pass through the grizzly to a jaw crusher. The rock is crushed to a nominal size of about 190 mm. The crushed rock can be feed to semi-autogeneous grinding mill. Single coarse and fine grinding circuits are arranged to reduce the crushed rock in two stages from about 190 mm to a $P_{80}$ of about 53 μm. The first step typically includes a single semi-autogeneous grinding of the crushed rock to form a first semi-autogeneous grind. The first semi-autogeneous grind is generally in the form of pebbles. Typically, the pebbles have a size of about 25 by 3 mm. The pebbles of the semi-autogeneous grind are typically crushed in single cone crusher to size of about 6 mm. Following the single cone crusher, the crushed pebbles are further milled in a semi-autogeneous grinding process to form a second semi-autogeneous grind having a $P_{80}$ of about 3 mm. The second semi-autogeneous grind reports to a ball mill.

The ball mill product is classified by a fine screen circuit. The coarse oversize material joins the ball mill feed. Screen undersize, $P_{80}$ of about 53 μm, is typically pumped to a paste thickener to increase its solids density of between 45 to 55%. The thickener underflow is of sufficient concentration to be used directly in the leach process (see step 220). The thickener overflow is re-circulated within the coarse and fine grinding circuits. A bleed can be taken to limit salt content of the aqueous solution.

The ball mill provides a feed material comprising the valuable metal-containing material to leach circuit. In step 220, the feed material from the ball mill is contacted with the aqueous solution containing the alkali and/or alkaline earth metal halide and the oxidant. The contacting of the feed material from ball mill with the aqueous solution forms a pregnant leach solution and a depleted valuable metal-containing material. It can be appreciated that the pregnant leach solution comprises silver and vary little if any base metals. Moreover, the depleted valuable metal-containing material is substantially depleted of silver and is not substantially depleted of its base metals.

The pregnant leach solution and the depleted valuable metal-containing material are sent to countercurrent decantation circuit (step 230). It some embodiments, lead can be precipitated in step 220. Moreover, the precipitated lead is not sent to the countercurrent decantation circuit (step 230). The countercurrent decantation circuit is operated at about 2.5 wash ratio. Furthermore, the countercurrent decantation circuit can be thicken, wash and concentrate the depleted valuable metal-containing material. The countercurrent decantation step recovers more than about 99 wt % of the valuable metal contained in pregnant leach solution as overflow. The overflow is sent to chlorine kill circuit (step 240). The underflow, concentrate the depleted valuable metal-containing material, of the countercurrent decantation circuit is thickened and filtered to recover the aqueous solution, which is returned to the step 220, and provide concentrated solutions to be sent to the tailings pond 290.

In step 250, the overflow pregnant leach solution is contacted with hydrogen peroxide. The contacting of the overflow pregnant leach solution with the hydrogen peroxide typically takes place in a series of agitated, vented tanks. Moreover, the contacting of the overflow pregnant leach solution with the hydrogen peroxide decomposes at least most, if not all of the OCl⁻ to form a processed aqueous solution. The processed aqueous solution is sent to a sulfide precipitation circuit (step 260).

In step 260, the processed aqueous solution is contacted and mixed with NaHS. A silver sulfide precipitate is formed by the contacting of the processed aqueous solution with the HS⁻ precipitates at least most, if not all, of the silver contained in the processed aqueous solution. The silver sulfide precipitate is dispersed in the processed aqueous solution, the dispersion is sent to a filter circuit (step 270).

In step 270, a filter cake of silver sulfide is formed. The filter circuit can comprise a plate-and-frame filter press(es). The filter cake of silver sulfide is one or more of collected and dried. The filter cake of silver sulfide is suitable for further refining to recover the silver as silver metal. A spent brine liquid is also formed during the process of forming the filter cake of silver sulfide. The spent brine can be report to one or more of the tailing pond 290 and to the countercurrent decantation (step 230).

TABLE 5

| | Variable | | | | | |
|---|---|---|---|---|---|---|
| | Temp. | Brine Concentration | | | | |
| | Sample Run No. | | | | | |
| | 73 | 72 | 74 | 75 | 76 | 77 |
| General setup | | | | | | |
| NaCl, g/L | 150 | 150 | 175 | 200 | 225 | 225 |
| Solids feed amount, g | 454.5 | 454.6 | 454.5 | 454.6 | 454.1 | 454.5 |
| Temp, ° C. | 50 | Ambient | Ambient | Ambient | Ambient | Ambient |

TABLE 5-continued

| | Variable | | | | | |
|---|---|---|---|---|---|---|
| | Temp. | Brine Concentration | | | | |
| | Sample Run No. | | | | | |
| | 73 | 72 | 74 | 75 | 76 | 77 |
| End of run information | | | | | | |
| pH | 7.07 | 6.99 | 7.36 | 7.09 | 7.03 | 7.05 |
| Emf, mV | 915 | 944 | 892 | 928 | 976 | 883 |
| 100% NaOCl used, kg/t | 8.0 | 7.0 | 7.0 | 6.4 | 12.3 | 6.4 |
| Brine at finish (NaCl), g/L | 157 | 158 | 187 | 217 | 235 | 244 |
| Metallurgical balance (elemental), % | | | | | | |
| Fe | 95 | 97 | 102 | 102 | 102 | 102 |
| Zn | 89 | 89 | 91 | 94 | 91 | 100 |
| Pb | 93 | 93 | 96 | 95 | 96 | 96 |
| Ag | 88 | 87 | 87 | 99 | 95 | 84 |
| Recovery, % | | | | | | |
| Ag (calc head: feed/residue) | 64/68 | 60/65 | 59/64 | 52/52 | 65/67 | 60/67 |
| Fe feed/residue | 5 | 3 | −2 | −2 | −2 | −2 |
| Zn feed/residue | 12 | 13 | 12 | 8 | 11 | 11 |
| Pb feed/residue | 7 | 8 | 5 | 6 | 4 | 4 |

Solids feed = II;
Run Time = 6 hours;
Pulp density, 45.0% solids;
Grind size = $P_{80}$ 48 μm

TABLE 6

| | Variable | | | | | |
|---|---|---|---|---|---|---|
| | Temp. | Brine Concentration | | | | |
| | Sample Run No. | | | | | |
| | 79 | 78 | 80 | 81 | 82 | 83 |
| General setup | | | | | | |
| Solids feed, g | 454.48 | 454.58 | 454.55 | 454.52 | 454.59 | 454.54 |
| Temp, ° C. | 50 | Ambient | Ambient | Ambient | Ambient | Ambient |
| End of run information | | | | | | |
| pH | 6.96 | 7.04 | 7.00 | 6.97 | 7.03 | 7.03 |
| Emf, mV | 906 | 1,003 | 922 | 892 | 903 | 956 |
| NaOCl used, kg/t | 10.4 | 7.7 | 8.7 | 6.9 | 8.2 | 8.9 |
| NaCl at finish, g/L | 142 | 144 | 167 | 193 | 215 | 214 |
| Metallurgical balance, % | | | | | | |
| Fe | 103 | 106 | 104 | 104 | 106 | 108 |
| Zn | 93 | 94 | 91 | 90 | 94 | 95 |
| Pb | 95 | 98 | 98 | 98 | 98 | 98 |
| Ag | 102 | 100 | 99 | 106 | 104 | 100 |
| Recovery, % | | | | | | |
| Ag (calc head: feed/residue) | 64/64 | 61/61 | 62/63 | 58/58 | 63/62 | 6262 |
| Fe feed/residue | −3 | −6 | −4 | −4 | −6 | −8 |
| Zn feed/residue | 7 | 7 | 9 | 15 | 9 | 9 |
| Pb feed/residue | 5 | 2 | 2 | 2 | 2 | 2 |

Solids feed = I;
NaCl = 150 g/L;
Run Time = 6 hours;
Pulp density = 45.0% solids;
Grind size, $P_{80}$ 50 μm

TABLE 7

| | Sample Run No. | | | | | | | | | |
|---|---|---|---|---|---|---|---|---|---|---|
| | 85 | 97 | 99 | 87 | 105 | 103 | 89 | 91 | 101 | 93 |
| General setup | | | | | | | | | | |
| Solids feed amount, g | 454.6 | 454.5 | 454.6 | 505.1 | 537.5 | 462.6 | 454.6 | 454.6 | 462.7 | 454.5 |
| Pulp Density, % solids | 45.0 | 45.0 | 45.0 | 50.0 | 48.7 | 45.0 | 45.0 | 45.0 | 45.0 | 45.0 |
| End of run information | | | | | | | | | | |
| pH | 3.95 | 5.99 | 5.28 | 7.36 | 6.99 | 7.01 | 7.11 | 7.11 | 7.02 | 7.12 |
| Emf, mV | 1,035 | 901 | 793 | 950 | 604 | 747 | 809 | 989 | 962 | 913 |
| NaOCl used, kg/t | 7.8 | 6.9 | 4.9 | 9.5 | 2.6 | 3.7 | 6.5 | 8.8 | 17.7 | 9.4 |
| NaCl at finish, g/L | 142 | 143 | 145 | 139 | 145 | 144 | 143 | 142 | 132 | 141 |
| Balance % | | | | | | | | | | |
| Fe | 108 | 107 | 105 | 108 | 125 | 108 | 106 | 108 | 112 | 108 |
| Zn | 94 | 88 | 90 | 99 | 109 | 91 | 94 | 95 | 90 | 97 |
| Pb | 95 | 93 | 94 | 99 | 104 | 91 | 96 | 97 | 95 | 97 |
| Ag | 107 | 111 | 109 | 99 | 133 | 114 | 111 | 99 | 105 | 101 |
| Recovery, % | | | | | | | | | | |
| Ag (calc head: free/residue) | 61/58 | 58/53 | 51/47 | 62/62 | 14/−14 | 39/30 | 57/52 | 61/61 | 59/57 | 60/60 |
| Fe feed/residue | −8 | −7 | −5 | −8 | −25 | −8 | −6 | −8 | −12 | −8 |
| Zn feed/residue | 29 | 22 | 22 | 1 | −9 | 9 | 7 | 6 | 12 | 4 |
| Pb feed/residue | 13 | 7 | 8 | 1 | −4 | 9 | 4 | 3 | 5 | 3 |

* Solids Feed I;
Temperature = ambient;
run time = 6 hours;
Grind size = $P_{80}$ 50 μm Brine (NaCl) Concentration 150 g/L

TABLE 8

| | Sample Run No. | | | | | | | | |
|---|---|---|---|---|---|---|---|---|---|
| | 86 | 98 | 100 | 88 | 102 | 104 | 90 | 92 | 94 |
| General setup | | | | | | | | | |
| Solids feed amount, g | 454.5 | 454.5 | 454.5 | 505.1 | 462.6 | 462.6 | 454.5 | 454.5 | 454.6 |
| Pulp density, % solids | 45.0 | 45.0 | 45.0 | 50.0 | 45.0 | 45.0 | 45.0 | 45.0 | 45.0 |
| End of run information | | | | | | | | | |
| pH | 3.85 | 6.01 | 5.13 | 7.08 | 7 | 7.17 | 7.37 | 7.46 | 7.07 |
| Emf, mV | 1,049 | 896 | 840 | 941 | 589 | 754 | 862 | 950 | 958 |
| 100% NaOCl used, g/t | 7.7 | 7.8 | 5.0 | 7.0 | 2.4 | 3.1 | 7.0 | 15.5 | 11.4 |
| Brine at finish (NaCl), g/L | 190 | 190 | 193 | 189 | 194 | 193 | 191 | 181 | 186 |
| Balance (elemental), % | | | | | | | | | |
| Fe | 108 | 108 | 104 | 107 | 98 | 107 | 106 | 109 | 110 |
| Zn | 92 | 92 | 90 | 93 | 81 | 92 | 93 | 98 | 97 |
| Pb | 93 | 97 | 95 | 98 | 85 | 87 | 97 | 96 | 97 |
| Ag | 99 | 108 | 102 | 104 | 80 | 103 | 103 | 105 | 102 |
| Recovery, % | | | | | | | | | |
| Ag (cal head: feed/residue) | 57/58 | 57/54 | 4/466 | 63/62 | 32/46 | 45/43 | 65/64 | 64/62 | 63/62 |
| Fe feed/residue | −8 | −8 | −4 | −7 | −2 | −7 | −6 | −9 | −10 |
| Zn feed/residue | 26 | 20 | 23 | 7 | 19 | 8 | 9 | 3 | 5 |
| Pb feed/residue | 17 | 3 | 8 | 2 | 15 | 13 | 3 | 4 | 3 |

Solids Feed I;
Temperature = ambient;
run time = 6 hours;
Grind size = $P_{80}$ 50 μm Brine (NaCl) Concentration 200 g/L

TABLE 9

| Variable | Sample Run No. 95 | Sample Run No. 96 |
|---|---|---|
| General setup | | |
| Solids feed amount, g | 454.6 | 454.5 |
| End of run information | | |
| pH | 7.06 | 6.99 |
| Emf, mV | 942 | 918 |
| NaOCl used, kg/t | 9.1 | 7.8 |
| NaCl at finish, g/L | 141 | 190 |
| Balance (elemental), % | | |
| Fe | 108 | 107 |
| Zn | 97 | 94 |
| Pb | 98 | 97 |
| Ag | 97 | 100 |
| Recovery, % | | |
| Ag (calc head:feed/residue) | 53/55 | 55/55 |
| Fe feed/residue | −8 | −7 |
| Zn feed/residue | 4 | 7 |
| Pb feed/residue | 2 | 3 |

* Solids Feed I; Temperature = ambient; run time = 6 hours; pulp density = 45.0% solids; Grind size = 74 μm A number of variations and modifications of the disclosure can be used. It would be possible to provide for some features of the disclosure without providing others.

For example in one alternative embodiment, the brine leach is conducted at an acidic pH to dissolve base metals into solution.

In another alternative embodiment, the brine leach is conducted at higher temperature to provide increased leaching kinetics.

In another alternative embodiment, base metals are removed from a bleed stream of the barren leach solution but not from the remainder of the barren leach solution.

In another alternative embodiment, the valuable metal-containing material is subjected to bio-oxidation to decompose at least most of the sulfides prior to brine leaching. Bio-oxidation requires an energy source, which is chemically reduced iron ($Fe^{2+}$) or chemically reduced sulfur compounds, such as sulfide. When mineral feed is provided as an energy source, $Fe^{3+}$ generated by microbial oxidation of $Fe^{2+}$ oxidizes the mineral sulfide (e.g., pyrite). The $Fe^{3+}$ oxidation of mineral sulfide reduces the iron to $Fe^{2+}$, produces sulfuric acid, and also releases $Fe^{2+}$ from the mineral. The reduced iron is then re-oxidized by the microbes as the energy source.

TABLE 10

| | Test | | | | | | | | | | | |
|---|---|---|---|---|---|---|---|---|---|---|---|---|
| | Brine Concentration | | | | | pH Control | | | | Primary Filtrate Recycle | | |
| | Sample Run No. | | | | | | | | | | | |
| | 106 | 107 | 108 | 109 | 110 | 111 | 112 | 113 | 114 | 118 | 119 | 120 |
| General setup | | | | | | | | | | | | |
| Brine NaCl, g/L | 150 | 175 | 225 | 250 | 140 | 150 | 200 | 150† | 200† | 225 | 215* | 212* |
| Solids feed amount, g | 454.6 | 454.5 | 454.6 | 454.6 | 454.6 | 454.6 | 454.6 | 454.6 | 454.6 | 606.2 | 352.6 | 236.0 |
| End of run information | | | | | | | | | | | | |
| pH | 7.02 | 7.00 | 7.05 | 7.05 | 6.99 | 6.97 | 7.12 | 7.00 | 7.01 | 7.04 | 6.99 | 7.01 |
| Emf, mV | 886 | 884 | 910 | 911 | 901 | 921 | 921 | | | 891 | 910 | 915 |
| 100% NaOCl used, kg/t | 7.1 | 7.0 | 7.3 | 7.1 | 7.3 | 7.1 | 7.9 | 7.7 | 7.8 | 7.9 | 8.6 | 8.9 |
| Brine at finish (NaCl), g/L | 143 | 167 | 205 | 228 | 127 | 137 | 179 | 135 | 179 | 215 | 212 | 214 |
| Ag conc. mg/L | 48.3 | 50.8 | 53.5 | 52.5 | 48.4 | 48.7 | 52.9 | 78.4 | 105.0 | 55.3 | 98.8 | 137.0 |
| Balance % | | | | | | | | | | | | |
| Fe | 108 | 105 | 110 | 111 | 110 | 109 | 104 | 104 | 107 | 108 | 110 | 108 |
| Zn | 91 | 89 | 91 | 92 | 96 | 94 | 88 | 87 | 9 | 89 | 93 | 94 |
| Pb | 92 | 88 | 90 | 90 | 93 | 94 | 91 | 91 | 95 | 94 | 93 | 95 |
| Ag | 92 | 100 | 98 | 99 | 88 | 89 | 97 | 77 | 93 | 97 | 88 | 87 |
| Recovery, % | | | | | | | | | | | | |
| Ag (calc'd head)/(feed residue) | 61/64 | 56/56 | 60/61 | 59/59 | 52/58 | 55/60 | 57/59 | 57/59 | 59/49 | 55/57 | 50/60 | 44/59 |
| Fe feed/residue | −8 | −5 | −10 | −11 | −10 | −9 | −4 | −4 | −7 | −8 | −10 | −8 |
| Zn feed/residue | 10 | 13 | 12 | 11 | 5 | 7 | 14 | 14 | 10 | 13 | 10 | 10 |
| Pb feed/residue | 8 | 12 | 10 | 10 | 7 | 6 | 9 | 9 | 6 | 6 | 7 | 5 |

Solids Feed I;
Temperature/Ambient;
Run time/6 hours;
Pulp Density/45%;
Grind size, $P_{80}$ 50 μm † recycled;
*(−118 PF);
**(−119 PF)

The present disclosure, in various aspects, embodiments, and configurations, includes components, methods, processes, systems and/or apparatus substantially as depicted and described herein, including various aspects, embodiments, configurations, sub-combinations, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
   contacting a metal-containing mineral comprising silver and a base metal with an aqueous solution comprising an alkali and/or alkaline earth metal halide and a halide-containing oxidant, wherein the aqueous solution has a solution pH of about pH 6 or more and an oxidation/reduction potential from about 550 to about 1,200 mV measured with a Pt—Ag/AgCl electrode in saturated KCl during the contacting of the metal-containing mineral and wherein the contacting of the aqueous solution with the metal-containing mineral dissolves the silver into a pregnant leach solution and forms a silver-depleted material;
   recovering the dissolved silver from the pregnant leach solution; and
   recovering about 50 wt. % or more of the base metal in the metal-containing mineral, wherein the recovered about 50 wt. % or more of the base metal is maintained in the silver-depleted material.

2. The process of claim 1, wherein the halide is chloride and wherein the aqueous solution has a solution pH from about pH 6.0 to about pH 10.5 during the contacting of the metal-containing mineral.

3. The process of claim 1, wherein the aqueous solution has a solution pH from about pH 7 to about pH 9 during the contacting of the metal-containing mineral.

4. The process of claim 1, wherein during the contacting of the metal-containing mineral and aqueous solution, the metal-containing mineral and aqueous solution are at ambient temperature.

5. The process of claim 1, wherein during the contacting of the metal-containing mineral and aqueous solution, the metal-containing mineral and aqueous solution has a temperature from about 40 to about 100 degrees Fahrenheit.

6. The process of claim 1, wherein the oxidation/reduction potential of the aqueous solution during the contacting step is from about 850 to about 1,000 mV measured with the Pt—Ag/AgCl electrode in saturated KCl.

7. The process of claim 1, wherein the base metal comprises one of lead, zinc, copper or a mixture thereof, wherein the recovered about 50 wt. % or more of the base metal in the metal-containing mineral comprises 80 wt. % or more base metal in the metal-containing mineral, and wherein the recovered about 80 wt. % or more of the base metal is maintained in the metal-containing material.

8. The process of claim 1, wherein the base metal comprises one of lead and zinc, or a mixture thereof, wherein the recovered about 50 wt. % or more of the base metal in the metal-containing mineral comprises 80 wt. % or more base metal in the metal-containing material, and wherein the recovered about 85 wt. % or more of the base metal is maintained in the silver-depleted material.

9. The process of claim 1, wherein the oxidant comprises $OCl^-$.

10. The process of claim 1, wherein the recovery of the silver comprises a sub-step of precipitating the silver as silver sulfide.

11. The process of claim 1, wherein the aqueous solution comprises from about 150 to about 250 g/L of the alkali and/or alkaline earth metal halide.

12. A process, comprising:
   contacting a silver-containing mineral comprising one or more base metals with an aqueous solution comprising an alkali and/or alkaline earth metal chloride and a halide-containing oxidant, wherein the aqueous solution has a solution pH from about pH 6.5 to about pH 10.5 and an oxidation/reduction potential from about 550 to about 1,200 mV measured with a Pt—Ag/AgCl electrode in saturated KCl during the contacting of the silver-containing mineral and wherein the contacting of the silver-containing mineral with the aqueous solution dissolves most of the silver in the silver-containing mineral into a pregnant leach solution and forms a silver-depleted material;
   recovering the dissolved silver from the pregnant leach solution, wherein the recovered silver comprises about 50 wt. % or more of the silver in the silver-containing mineral; and
   recovering about 50 wt. % or more of the base metal in the silver containing mineral, wherein the recovered about 50 wt. % or more of the base metal is maintained in the silver-deleted material.

13. The process of claim 12, wherein the aqueous solution has a solution pH is from about pH 6.5 to about pH 9 during the contacting of the silver-containing mineral.

14. The process of claim 12, wherein during the contacting of the silver-containing mineral and aqueous solution, the silver-containing mineral and the aqueous solution is at ambient temperature.

15. The process of claim 12, wherein the recovered silver comprises more than about 80 wt. % of the silver in the silver-containing mineral, wherein the recovered base metal further comprises copper, wherein the recovered base metal comprises about 80 wt. % or more of than the base metal in the silver containing mineral, wherein the recovered about 80 wt. % or more of the base metal is maintained in the silver-containing mineral.

16. The process of claim 12, wherein the halide-containing oxidant comprises $OCl^-$.

17. The process of claim 12, wherein the recovery of the silver comprises a sub-step of precipitating the silver as silver sulfide.

18. The process of claim 12, wherein the aqueous solution comprises from about 150 to about 250 g/L of the alkali and/or alkaline earth metal halide.

19. A process, comprising:
   contacting a silver-containing mineral comprising silver oxide and one or more of lead and zinc with an aqueous solution comprising an alkali and/or alkaline earth metal chloride and a halide-containing oxidant, wherein the aqueous solution has a solution pH of from about pH 6.5 to about pH 10.5 and an oxidation/reduction potential of from about 550 to about 1,200 mV measured with a Pt—Ag/AgCl electrode in saturated KCl during the contacting of the silver-containing mineral and wherein the contacting of the silver-containing mineral dissolves the one or more of lead and zinc into a pregnant leach solution and forms a silver-depleted material;
   recovering about 50 wt. % or more of the silver contained in the silver-containing mineral; and
   recovering about 85 wt. % or more of the one or more lead and zinc in the silver-containing mineral, wherein the recovered about 85 wt. % or more of the one or more lead and zinc is maintained in the silver-depleted material.

20. The process of claim 19, wherein the aqueous solution has a solution pH from about pH 6.5 to about pH 8.5 during the contacting of the silver-containing mineral.

21. The process of claim 19, wherein during the contacting of the silver-containing mineral and aqueous solution, the silver-containing material and the aqueous solution is at ambient temperature.

22. The process of claim 19, wherein the recovered about 50 wt. % or more of the silver contained in the silver-containing mineral comprises about 80 wt. % or more of the silver in the silver-containing material.

23. The process of claim 19, wherein the halide-containing oxidant comprises $OCl^-$.

24. The process of claim 19, wherein the recovery of the silver comprises a sub-step of precipitating the silver as silver sulfide.

25. The process of claim 19, wherein the aqueous solution comprises from about 150 to about 250 g/L of the alkali and/or alkaline earth metal chloride.

\* \* \* \* \*